(12) United States Patent
Ikeda

(10) Patent No.: US 8,232,668 B2
(45) Date of Patent: Jul. 31, 2012

(54) SYNCHRONIZATION POINT DETECTION METHOD AND POWER LINE COMMUNICATION APPARATUS

(75) Inventor: Koji Ikeda, Fukuoka (JP)

(73) Assignee: Panasonic Corporation, Osaka (JP)

( * ) Notice: Subject to any disclaimer, the term of this patent is extended or adjusted under 35 U.S.C. 154(b) by 548 days.

(21) Appl. No.: 12/482,976

(22) Filed: Jun. 11, 2009

(65) Prior Publication Data

US 2009/0310688 A1 Dec. 17, 2009

(30) Foreign Application Priority Data

Jun. 12, 2008 (JP) ................................. 2008-154274

(51) Int. Cl.
*H02J 3/00* (2006.01)
*H04B 3/54* (2006.01)
(52) U.S. Cl. ...................... 307/3; 307/1; 307/4; 375/354
(58) Field of Classification Search .............. 307/1, 3–4; 327/79, 205; 340/12.32; 375/354; 455/402
See application file for complete search history.

(56) References Cited

U.S. PATENT DOCUMENTS

| | | | |
|---|---|---|---|
| 6,115,429 A | 9/2000 | Huang | |
| 7,218,679 B2 * | 5/2007 | Kodama et al. | 375/259 |
| 7,542,512 B2 * | 6/2009 | Kodama et al. | 375/259 |
| 7,660,365 B2 * | 2/2010 | Koga et al. | 375/295 |
| 8,040,435 B2 * | 10/2011 | Chon et al. | 348/524 |
| 2002/0196095 A1 | 12/2002 | Kaku | |

FOREIGN PATENT DOCUMENTS

| | | |
|---|---|---|
| JP | 09-116525 | 5/1997 |
| JP | 10-290184 | 10/1998 |
| JP | 2003-008479 | 1/2003 |
| WO | 97/06623 | 2/1997 |

OTHER PUBLICATIONS

International Search Report dated Oct. 15, 2009.

* cited by examiner

*Primary Examiner* — Hal Kaplan
(74) *Attorney, Agent, or Firm* — Dickinson Wright PLLC

(57) ABSTRACT

A method for detecting a synchronization point of an alternating power in comparing the alternating waveform with a threshold voltage is provided. The method includes the steps of detecting a rising point at which the voltage of the alternating waveform changes from a level lower than the threshold voltage to a level equal to or higher than the threshold voltage; detecting a falling point at which the voltage of the alternating waveform changes from a level equal to or higher than the threshold voltage to a level lower than the threshold voltage; measuring a first interval from the rising point to the falling point subsequent to the rising point; measuring a second interval from the falling point to the rising point subsequent to the falling point; and determining the synchronization point based on a difference between the length of the first interval and the length of the second interval.

11 Claims, 19 Drawing Sheets

FIG.21

| RISING POINT | 220 $\mu$ sec |
|---|---|
| FALLING POINT | 250 $\mu$ sec |
| SYNCHRONIZATION POINT 1 | 0.6 $\mu$ sec |
| SYNCHRONIZATION POINT 2 | 17 $\mu$ sec |
| SYNCHRONIZATION POINT 3 | 18 $\mu$ sec |
| SYNCHRONIZATION POINT 4 | 9 $\mu$ sec |

SYNCHRONIZATION POINT DETECTION METHOD AND POWER LINE COMMUNICATION APPARATUS

BACKGROUND

1. Technical Field

The present invention relates to a synchronization point detection method for detecting the timings of a synchronization point and a power line communication apparatus using the same.

2. Background Art

In recent years, a power line communication (PLC) technology that uses a household power line as a transmission channel for communication has been put into practical use, and a power line communication apparatus employing this technology such as a PLC modem has been commercialized, For instance, when a first power line communication apparatus and a second power line communication apparatus connected to a common power line coexist on the common power line and bidirectional communication is carried out between these apparatuses, only one power line is available as a signal transmission channel. Therefore, it is necessary to synchronize the transmission/reception timings between the first power line communication apparatus and the second power line communication apparatus so that the communication can be carried out by efficiently using the transmission channel while preventing signals transmitted by the first power line communication apparatus from colliding with signal transmitted by the second power line communication apparatus on the transmission channel.

In the power line communication, since a sinusoidal alternating power of AC 100 V or the like is generally supplied through the power line as the transmission channel, a reference time point can be detected from the waveform of the alternating power and used for synchronization of the communication. That is to say, since the common alternating power is applied through the power line to respective PLC modems, the respective PLC modems are able to synchronize the timings of the communication controlled by respective station (PLC modems) by detecting the reference time point from the waveform of the alternating power.

As a method for detecting the synchronization point, the following technologies are known. The technology disclosed in JP-A-9-116525 uses a photo coupler including a photo diode to generate a signal indicating a reception period which is roughly synchronized with the power cycle based on a comparison between the waveform of the power source and a predetermined threshold value. The technology uses a spread spectrum modulation/demodulation method to generate a transmission timing signal at the time of demodulating data received within the roughly synchronized period, thereby taking more exact synchronization.

The technology disclosed in JP-A-10-290184 calculates the average cycle period of an alternating power using the ON/OFF timings of the reception timings of received transmission signals to detect the reception timings of the transmission signals in the subsequent cycle period based on the zero crossing time points of an alternating power and the average cycle period.

The technology disclosed in JP-A-2003-008479 detects the period of time, during which a power cycle period has a specific phase, from a cycle period twice the fundamental cycle period that is synchronized with the power cycle period.

In the technology disclosed in JP-A-9-116525, since the spread spectrum modulation/demodulation method is used, the transmission/reception timings are determined such that the timings on the transmitting side are generated using the timings detected on the receiving side when decoding the received data. However, it is difficult to determine the accurate transmission/reception timings in advance of the transmission and reception.

As a method of determining the timings in advance using a power waveform, JP-A-9-116525 discloses a method of detecting the zero crossing point of an alternating waveform of a power based on a comparison between the power waveform and a predetermined value.

However, there is a possibility that a relative large detection error may occur in the detected timing. For instance, in the case of using a photo coupler, the characteristics of the CTR (Current Transfer Ratio) of the photo coupler may become the cause of the error. The CTR of the photo coupler represents the ratio of the current flowing through a photo transistor on the output side to the current flowing through a light emitting diode on the input side. The CTR of the photo coupler typically has a value around 50 to 300 due to individual variation and may vary further due to aged deterioration or an ambient temperature.

When the CTR of the photo coupler varies, the relationship between the operating point (threshold voltage; 0.7 V, for example) of a transistor connected to the photo coupler itself or to the output side thereof and the alternating waveform voltage of a power varies. As a result, the time point at which the zero crossing point of the alternating waveform is detected may deviate.

If such a large time difference (220 to 250 μsec) occurs when detecting the zero crossing point of the alternating waveform, in the above-described power line communication apparatus, a large error may occur in the communication timings. Therefore, when the allowable time margin is small as in the case of time slots with a small time width, there is a possibility that signals collide with each other on the power line as the common transmission channel, thereby making it difficult to achieve high-speed communication.

However, when a circuit element such as a photo coupler exhibiting a small variation in the CTR characteristics, for example, is selected, or a circuit element capable of compensating for the influence of a secular change or environmental change is added, the manufacturing cost may increase greatly.

Although the technologies disclosed in JP-A-9-116525, JP-A-10-290184 and JP-A-2003-008479 can synchronize the PLC modem to the power cycle without being influenced by the variation, it is difficult with the technologies for the respective PLC modems to detect a reference time point from the waveform of the alternating power, thereby accurately synchronizing the timings of the communication controlled by the respective stations (PLC modems).

Although the technologies disclosed in JP-A-10-290184 and JP-A-2003-008479 can detect the accurate power cycle, it is difficult with the technologies to detect the accurate zero crossing point which becomes the basis of the power cycle.

SUMMARY

An object of the invention is to provide a synchronization point detection method and a power line communication apparatus capable of suppressing the influence of the characteristic deterioration of a circuit element such as a photo coupler and detecting the time point exactly synchronized with an alternating waveform.

According to an aspect of the invention, there is provided a method of synchronization point detection for detecting a synchronization point of an alternating waveform of an alternating power based on a comparison of the alternating waveform and a threshold voltage, the method including the steps of: detecting a rising point at which the voltage of the alternating waveform changes from a level lower than the threshold voltage to a level equal to or higher than the threshold voltage; detecting a falling point at which the voltage of the alternating waveform changes from a level equal to or higher than the threshold voltage to a level lower than the threshold voltage; measuring a first interval from the rising point to the falling point subsequent to the rising point; measuring a second interval from the falling point to the rising point subsequent to the falling point; and determining the synchronization point based on a difference between the length of the first interval and the length of the second interval.

According to method of the synchronization point detection, it is possible to suppress the influence of the characteristic deterioration of the circuit element such as the photo coupler and to detect the time point exactly synchronized with the alternating waveform. Since the sum (corresponding to one-cycle period of the alternating waveform) of the first interval and the second interval is constant, the deviation of the time point appears as the difference between the first interval and the second interval. Therefore, by using the correction value calculated from the difference, it is possible to detect the correct time point of the synchronization point.

According to a still another aspect of the invention, there is provided a power line communication apparatus that performs a communication with an other power line communication apparatus via a power line to which electric power of an alternating power is supplied, the power line communication apparatus including: a detection circuit to which the alternating power is input, and which outputs a binary signal based on whether or not the level of a waveform of the alternating power is higher than a threshold value; a communication unit that transmits a control signal to the other power line communication apparatus; and a controller that transmits the control signal to the other power line communication apparatus based on the binary signal, wherein the controller is adapted to: detect a rising point at which the level of the waveform of the alternating power changes from a level lower than the threshold value to a level equal to or higher than the threshold value; detect a failing point at which the level of the waveform of the alternating power changes from a level equal to or higher than the threshold value to a level lower than the threshold value; measure the length of a first interval from the rising point to the falling point subsequent to the rising point; measure the length of a second interval from the failing point to the rising point subsequent to the falling point; and transmit the control signal at the timings based on a difference between the length of the first interval and the length of the second interval.

According to this power line communication apparatus, it is possible to determine the accurate transmission and reception timings in advance of the transmission and reception of signals. Since it is possible to perform power line communication with other power line communication apparatuses based on the accurate synchronization point which is determined in advance of the transmission and reception, it is possible to improve the quality of the power line communication. Accordingly, for example, even when the time width of the time slots used in the power line communication is decreased and the total number of time slots is increased, it is possible to take accurate synchronization. As a result, it is possible to improve the signal transmission speed or the utilization efficiency of the transmission channel.

According to the invention, it is possible to suppress the influence of the characteristic deterioration of the circuit element such as the photo coupler and to detect the time point exactly synchronized with the alternating waveform. Moreover, it is possible to improve the signal transmission speed in the power line communication and the utilization efficiency of the transmission channel.

BRIEF DESCRIPTION OF THE DRAWINGS

FIG. 21 is a table showing the amount of deviation of a synchronization point before and after correction according to the embodiment of the invention.

DETAILED DESCRIPTION

Hereinafter, a synchronization point detection method and a power line communication apparatus according to an embodiment of the invention will be described with reference to the drawings.

The power line communication apparatus according to the embodiment of the invention is an example of an apparatus for performing the synchronization point detection method. Hereinafter, it will be described under assumption that synchronization point detection is performed by the power line communication apparatus.

Figure 1:
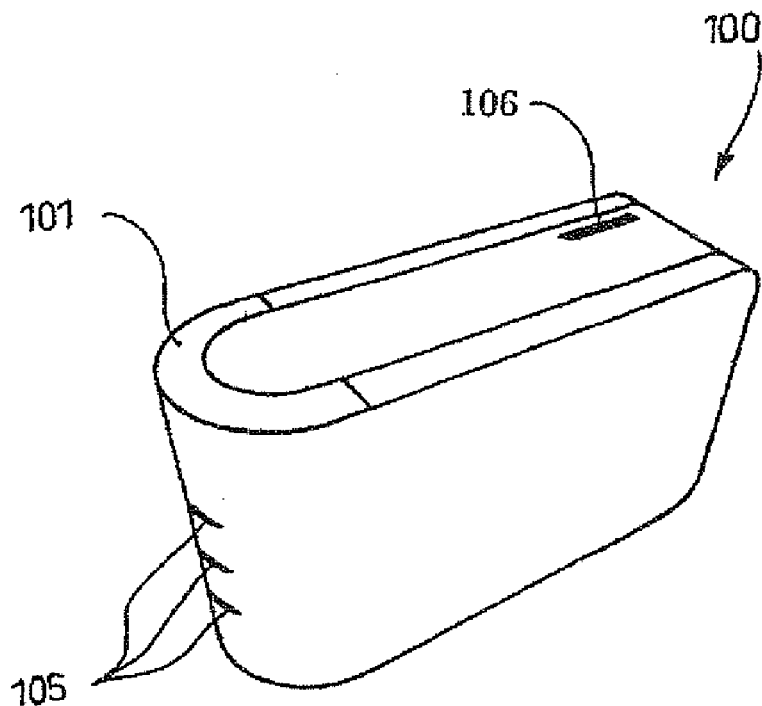
FIG. 1 is an external perspective view illustrating a front side of a PLC modem according to an embodiment of the invention.
Figure 2:
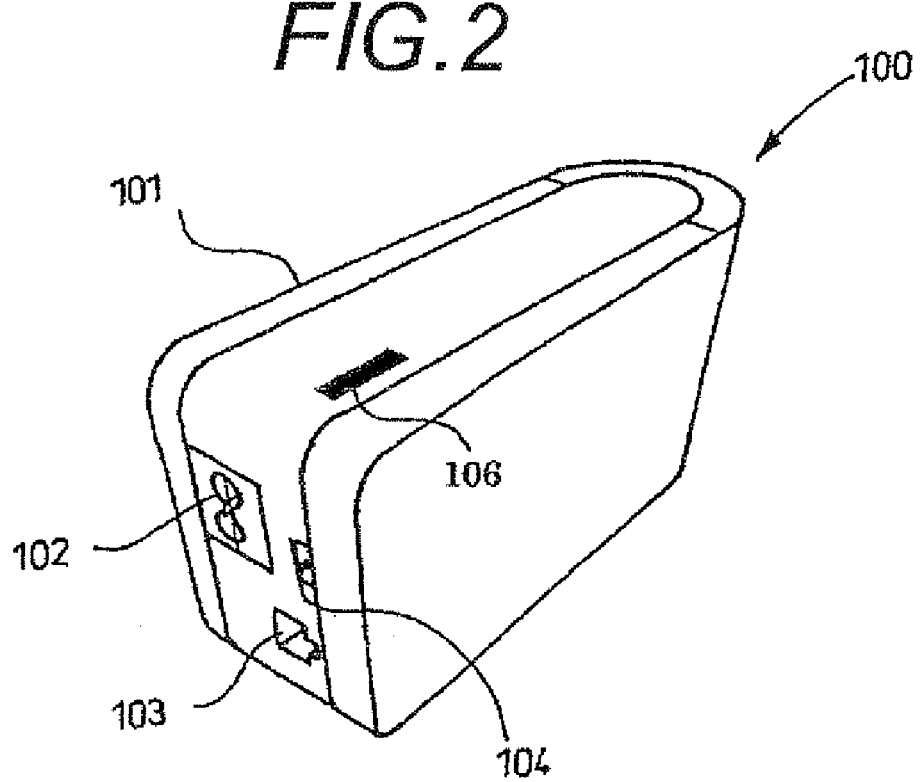
FIG. 2 is an external perspective view illustrating a rear side of a PLC modem according to the embodiment of the invention.

FIG. 1 is an external perspective view illustrating a front side of a PLC modem 100 as an example of the power line communication apparatus. FIG. 2 is an external perspective view illustrating a rear side of the PLC modem 100. Referring to FIGS. 1 and 2, a PLC modem 100 includes a casing 101. As shown in FIG. 1, an indicator 105 constituted by LEDs (Light Emitting Diodes) is provided on a front surface of the casing 101.

As shown in FIG. 2, a power connector 102, a modular jack 103 for the LAN (Local Area Network) such as the RJ45, and a switch 104 which switches operation modes are provided on a rear surface of the casing 101.

A button 106 is provided on a top surface of the casing 101. The button 106 functions as a setup button for activating a process (registration process) for putting the PLC modem 100 into a communicable state, for example. It should be noted that although the button 106 is illustrated as being provided on the top surface of the casing 101, the position is not limited to this.

A non-illustrated power cable is connected to the power connector 102 and a non-illustrated LAN cable is connected to the modular jack 103. In addition, a Dsub (D-subminiature) connector may be provided in the PLC modem 100 to connect a Dsub cable.

Although the PLC modem 100 is illustrated as an example of the power line communication apparatus, alternatively, the power line communication apparatus may be an electric apparatus incorporating therein a PLC modem. Examples of the electric apparatus include consumer electronics devices such as televisions, phones, video decoders, or set-top boxes and office equipments such as personal computers, fax machines, or printers.

The PLC modem 100 is connected to a power line 700, thereby constituting a power line communication system together with other PLC modems 100.

Figure 3:
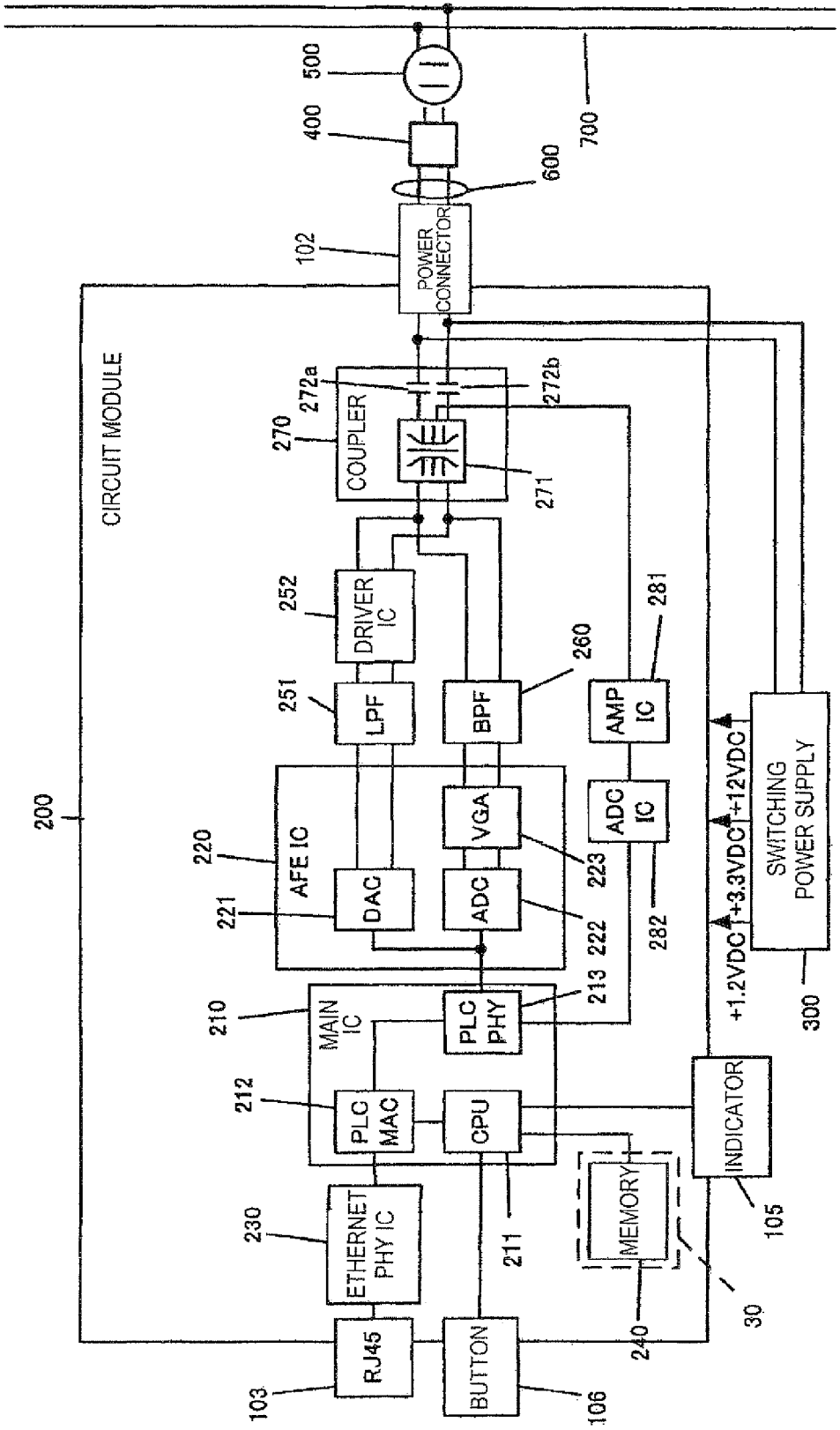
FIG. 3 is a diagram illustrating an exemplary hardware configuration of the PLC modem according to the embodiment of the invention.

Next, referring to FIG. 3, an exemplary hardware configuration of the PLC modem 100 is illustrated. The PLC modem 100 includes a circuit module 200 and a switching power supply 300. The switching power supply 300 supplies various types of voltage (for example, +1.2 V, +3.3 V, or +12 V) to the circuit module 200. For example, the switching power supply 300 includes a switching transformer and a DC-DC converter (not illustrated).

The circuit module 200 includes a main IC (Integrated Circuit) 210, an AFE IC (Analog Front END Integrated Circuit) 220, an Ethernet PHY IC (Physical layer Integrated Circuit) 230, a memory 240, a low-pass filter (LPF) 251, a driver IC 252, a band-pass filter (BPF) 260, a coupler 270, an amplifier (AMP) IC 281, and a ADC (AD conversion) IC 282. The switching power supply 300 and the coupler 270 are connected to the power connector 102 and connected to the power line 700 via a power cable 600, a power plug 400, and an outlet 500. The main IC 210 also functions as a control circuit which carries out power line communication.

The main IC 210 includes a CPU (Central Processing Unit) 211, a PLC MAC (Power Line Communication Media Access Control layer) block 212, and a PLC PHY (Power Line Communication Physical layer) block 213.

The CPU 211 mounts thereon a 32-bit RISC (Reduced Instruction Set Computer) processor. The PLC MAC block 212 manages a MAC layer (Media Access Control layer) of transmitting and receiving signals. The PLC PHY block 213 manages a PHY layer (Physical layer) of transmitting and receiving signals.

The AFE IC 220 includes a DA converter (DAC: DIA Converter) 221, an AD converter (ADC: A/D Converter) 222, and a variable gain amplifier (VGA) 223. The coupler 270 includes a transformer coil 271 and coupling capacitors 272a and 272b.

The CPU 211 controls the operations of the PLC MAC block 212 and the PLC PHY block 213 using data stored in the memory 240 and also controls the entire operation of the PLC modem 100.

Communication by the PLC modem 100 is carried out in the following manner. That is, data input from the modular jack 103 is transmitted to the main IC 210 via the Ethernet PHY IC 230 and a digital transmission signal is generated by digital signal processing. The generated digital transmission signal is converted into an analog signal by the DA converter (DAC) 221 of the AFE IC 220, and the converted analog signal is output to the power line 700 via the low-pass filter 251, the driver IC 252, the coupler 270, the power connector 102, the power cable 600, the power plug 400, and the outlet 500.

The signal received through the power line 700 is transmitted to the band-pass filter 260 via the coupler 270. After the analog signal is subjected to gain adjustment by the variable gain amplifier (VGA) 223 of the AFE IC 220, the analog signal is converted into a digital signal by the AD converter (ADC) 222. Subsequently, the converted digital signal is transmitted to the main IC 210 and is then converted into digital data by digital signal processing. The converted digital data is output from the modular jack 103 via the Ethernet PHY IC 230.

Figure 4:
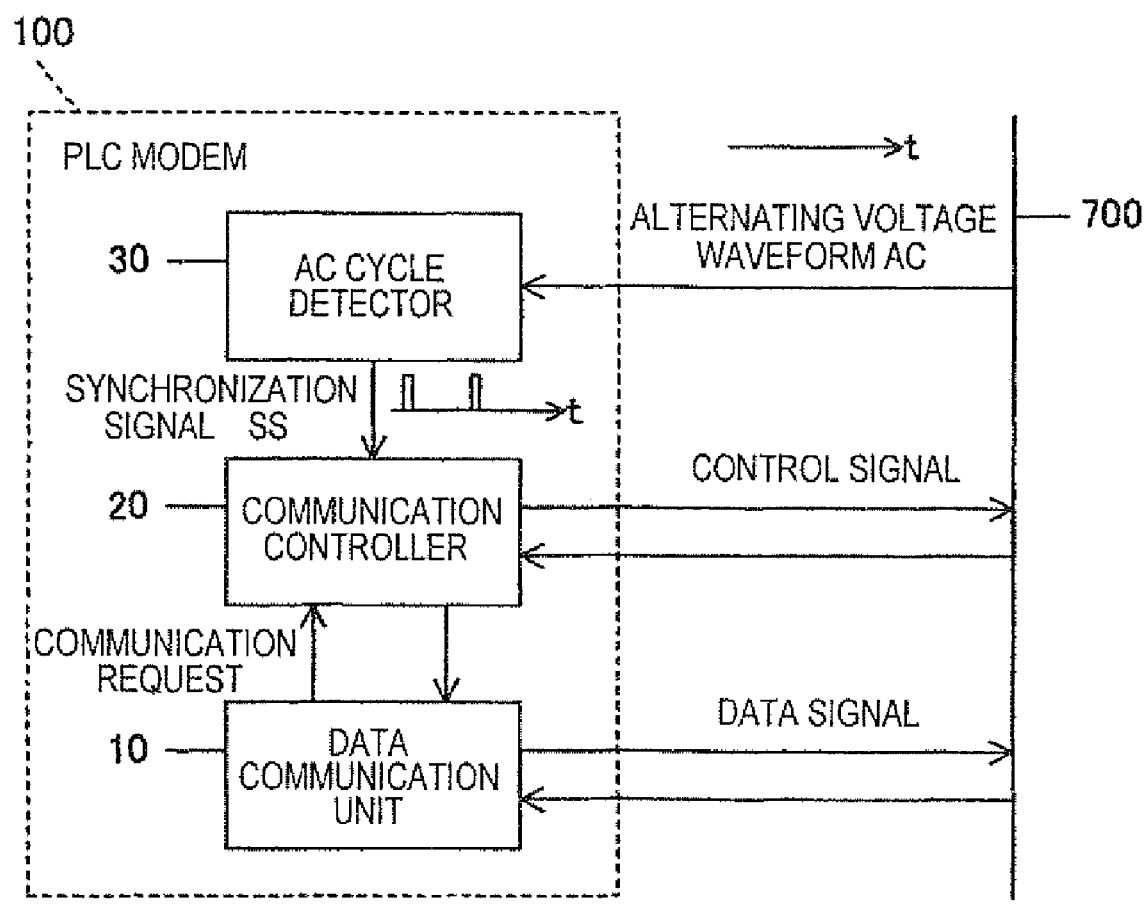
FIG. 4 is a block diagram illustrating an exemplary functional configuration of the PLC modem according to the embodiment of the invention.

A functional configuration example of the PLC modem 100 illustrated in FIG. 3 is shown in FIG. 4. As shown in FIG. 4, the PLC modem 100 includes a data communication circuit 10, a communication controller 20, and an AC cycle detector 30.

The data communication circuit 10 is an electric circuit which is included in the main IC 210 illustrated in FIG. 3 and capable of performing signal processing including general control and modulation/demodulation for the data communication similar to typical modems. Specifically, the data communication circuit 10 modulates data signals output from a communication terminal such as a non-illustrated personal computer to provide modulated signals, and outputs the modulated signals as transmitted signals (data). Furthermore, the data communication circuit 10 demodulates data signals input through the power line 700 to provide demodulated signals, and outputs the demodulated signals as received signals (data) to a communication terminal such as a personal computer. In addition, the data communication circuit 10 outputs a predetermined communication request signal to the communication controller 20 in advance of the data communication in order to confirm whether or not the power line 700 is ready for the data communication. Furthermore, the data communication circuit 10 performs the data communication at the frequency band or time period based on the instructions from the communication controller 20.

The communication controller 20 performs a control necessary for a plurality of types of PLC modems 100 to coexist on the power line 700 in synchronization with the timings of a synchronization signal SS output from the AC cycle detector 30. That is to say, the communication controller 20 performs a control to allow the respective stations (the PLC modems 100) to acquire a priority to use the power line 700 in accordance with the communication request output from the data communication circuit 10. Furthermore, the communication controller 20 transmits a control signal to the power line 700 in order to negotiate with other communication apparatuses (other PLC modems 100) for acquisition of the priority, and receives control signals via the power line 700.

The AC cycle detector 30 generates a synchronization signal, which is necessary for a plurality of types of PLC modems 100 to perform controls at the same timings. The plurality of types of PLC modems includes PLC modems having different communication systems from each other, or PLC modems made by manufacturers different from each other Practically, since a commercial power waveform, namely, an alternating voltage waveform AC having a sinusoidal wave having frequency of 50 Hz or 60 Hz in Japan, appears on the power line 700, the AC cycle detector 30 detects voltage zero crossing points of the alternating voltage waveform AC, thereby generating a synchronization signal SS based on the reference time point of the zero crossing points. The synchronization signal SS shown in FIG. 4, which is exemplary, is a rectangular wave including a plurality of pulses which are synchronized with the zero crossing points of the alternating voltage waveform AC. The alternating voltage waveform AC is an example of the alternating waveform of the power line and may be an alternating current waveform or an alternating power waveform.

Next, the AC cycle detector 30 for detecting the timings synchronized with the alternating waveform appearing on the power line will be described. In this example, the AC cycle detector 30 is implemented as a photo coupler including a light emitting diode and a photo transistor. The use of the photo coupler enables to electrically isolate an input-side circuit (power line side) and an output-side circuit and to easily detect the timings of an input-side waveform.

Figure 5:
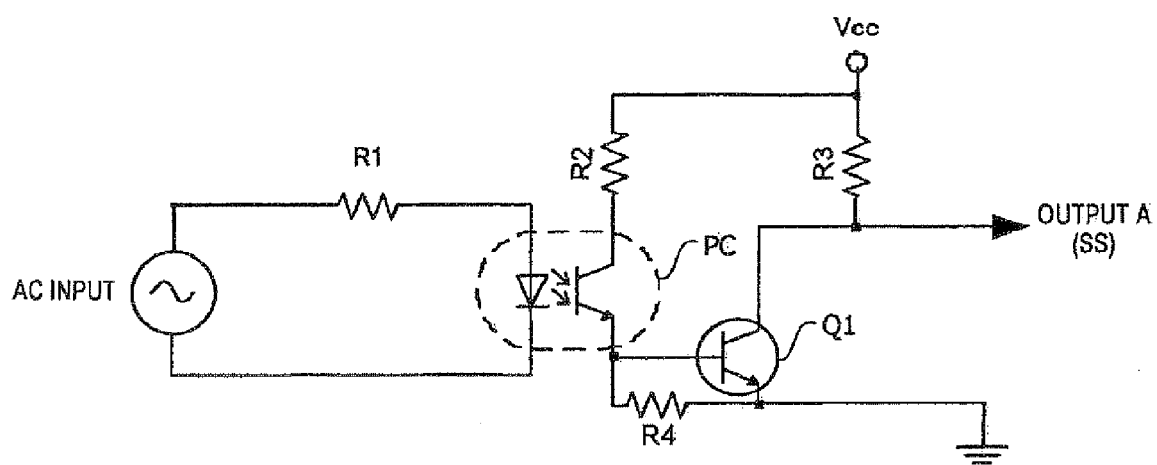
FIG. 5 is an electric circuit diagram illustrating a configuration example of a detection circuit using a photo coupler for detecting signals synchronized with an alternating waveform of an alternating power.

Referring to FIG. 5, the AC cycle detector 30 generating a signal synchronized with an AC cycle using the photo coupler is illustrated. In this detector, since current does not flow through the light emitting diode of the photo coupler PC during a period when an input alternating voltage has a negative polarity, no current flows through the photo transistor, the output-side transistor Q1 turns off, and the output (SS) has a high-level voltage (H). Moreover, when the input alternating voltage changes from negative polarity to positive polarity while crossing a zero crossing point and the voltage becomes higher than a predetermined threshold value of the photo coupler PC, current flows through the photo transistor, the output-side transistor Q1 turns on, and the output (SS) changes to a low-level voltage (L). Furthermore, when the input alternating voltage which is input after a lapse of a period of time corresponding to about the half cycle of the alternating voltage changes from positive polarity to approach the zero crossing point, and the voltage becomes lower than the predetermined threshold value of the photo coupler PC, no sufficient amount of current flows through the photo transistor, the output-side transistor Q1 turns off, and the output (SS) changes to high-level voltage (H). In this case, the circuit elements may have appropriate values: for example, R1=100 kΩ or 400 kΩ, R2=4.7 kΩ, R3=4.7 kΩ, R4=100 kΩ, and Vcc=3.3 V.

Figure 6:
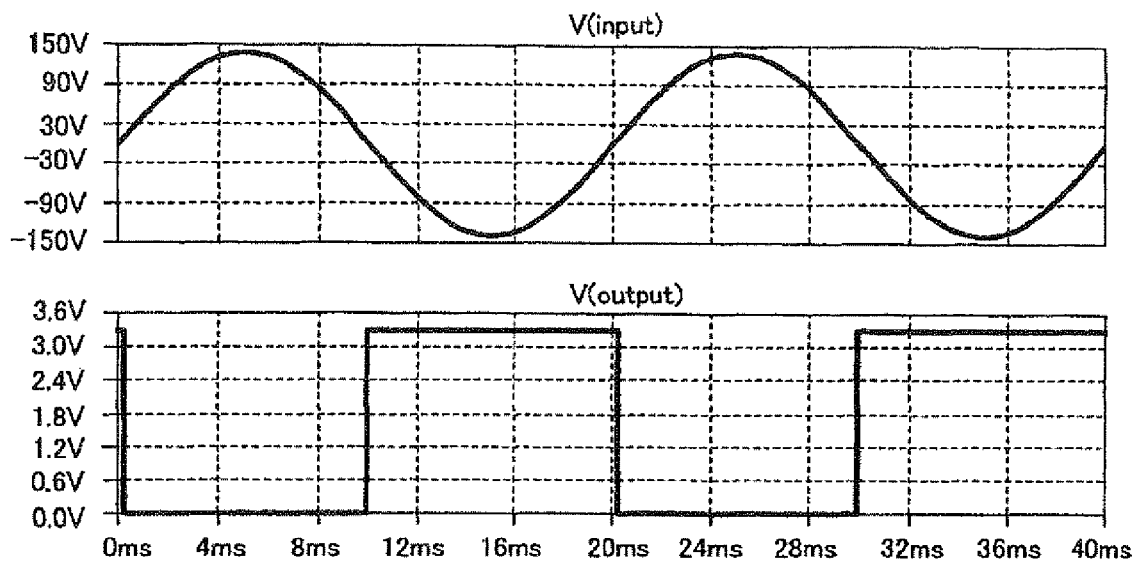
FIG. 6 is a waveform diagram illustrating specific example waveforms of input and output signal voltages of the detection circuit using the photo coupler.

By using such a detector shown in FIG. 5, it is possible to extract a rectangular signal (output signal: Voutput) that is synchronized with an alternating waveform (input signal: Vinput) of an alternating power, as illustrated in FIG. 6. That is to say, it is possible to obtain a rectangular wave in which the voltage level of the alternating waveform changes between two values: one value in a positive polarity period and the other value in a negative polarity period. Therefore, it is possible to detect the timings of a zero crossing point at which the voltage of the alternating waveform of a power changes from negative polarity to positive polarity or of a zero crossing point at which the voltage of the alternating waveform changes from positive polarity to negative polarity.

Figure 7:
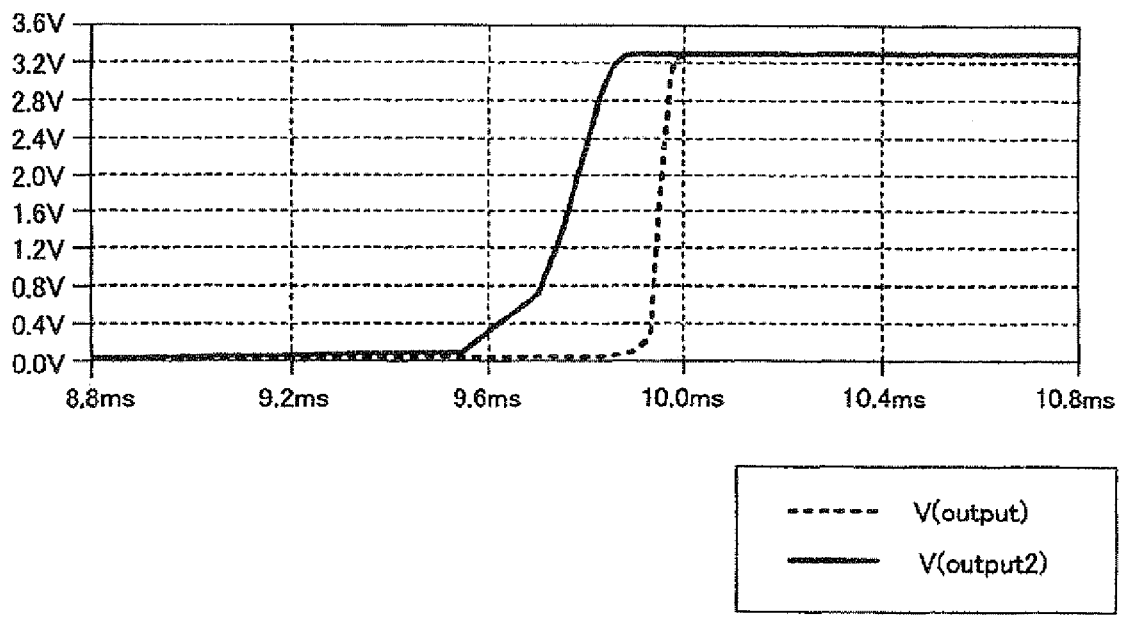
FIG. 7 is a waveform diagram illustrating specific examples of the rising waveforms of the output signal voltage of the detection circuit using photo couplers having different CTR values.
Figure 8:
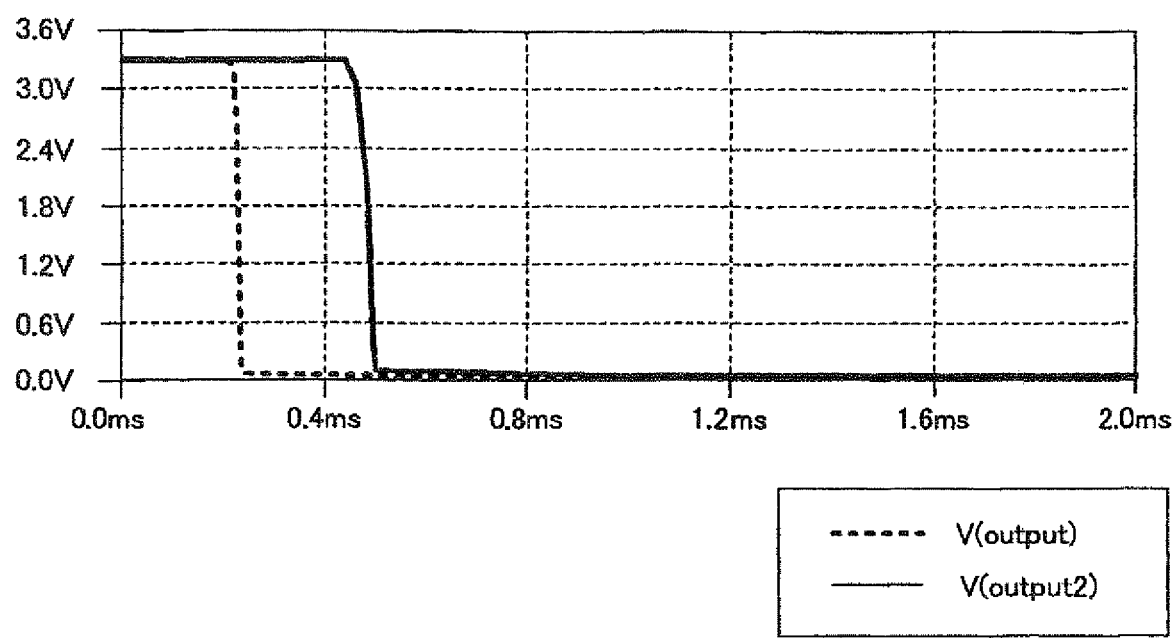
FIG. 8 is a waveform diagram illustrating specific examples of the falling waveforms of the output signal voltage of the detection circuit using photo couplers having different CTR values.

Next, a simulation result on the detection error when the CTR was changed to a value lower by the ratio of 1/4 will be described. In the circuit shown in FIG. 5, in order to simulate the change wherein the CTR is changed to a value lower by the ratio of 1/4, the waveform of an output signal and the change in time point when the resistance of the resistor R1 connected to the input side of the photo coupler was changed from 100 kΩ to 400 kΩ (in other words, when the amount of current flowing through the photo diode was decreased by the ratio of 1/4) were observed using a simulator (called SPICE). The simulation result showed that the time point at which the output rises from low-level voltage (L) to high-level voltage (H) occurred with a time difference of 220 μsec between the output signal (Voutput) obtained before the CTR was changed and the output signal (Voutput2) obtained after the CTR was changed, as illustrated in FIG. 7, assuming that the operating point voltage changing from low level to high level was 0.8 V. In addition, the simulation result showed that the time point at which the output falls from high level to low level occurred with a time difference of 250 μsec between the output signal (Voutput) obtained before the CTR was changed and the output signal (Voutput2) obtained after the CTR was changed, as illustrated in FIG. 8, assuming that the operating point voltage changing from high level to low level was 2.0 V.

Figure 9:
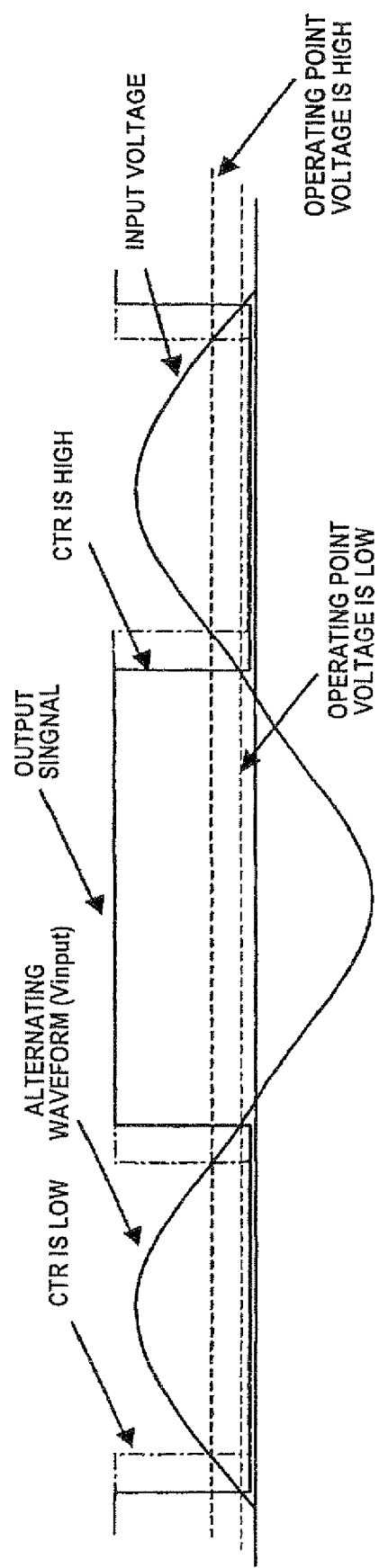
FIG. 9 is a waveform diagram illustrating a specific example of a change in the time point of the output signal voltage occurring due to a change in the characteristics of the detection circuit using the photo coupler.

The general tendency shows that, when the CTR decreases, the rising point of the output signal (rectangular wave) is shifted backward (leftward) in time axis compared with the case before change while the falling point is shifted forward (rightward) in time axis as shown in FIG. 9. The amount of time shift is substantially identical in forward and backward directions. This is because the input current (voltage) necessary for the output of a circuit (a photo coupler or the like) converting the voltage of an alternating waveform into a binary signal to change from high level to low level and the input current (voltage) necessary for the output to change from low level to high level vary with the CTR.

By using the characteristics of this detector that the amount of time shift is substantially identical in forward and backward directions, it is possible to detect the timings exactly synchronized with the alternating waveform by using the output signal. The time point detection method will be described below.

Figure 10:
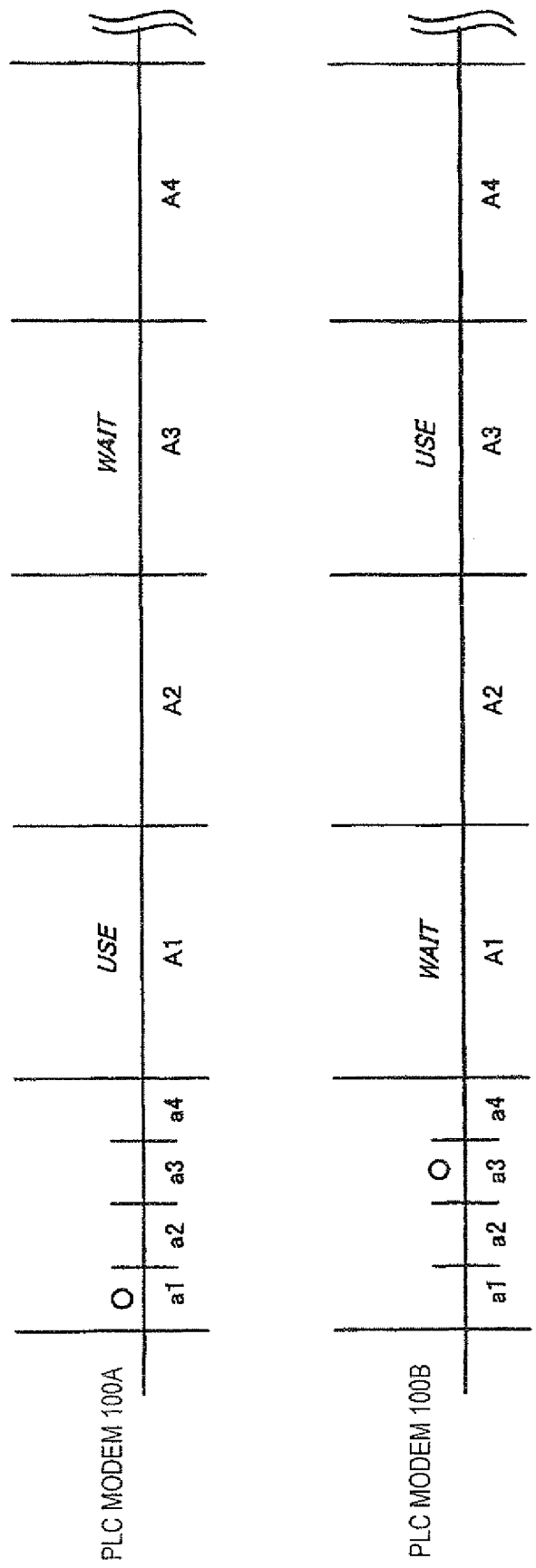
FIG. 10 is a timing chart illustrating an example of coexistence processing using an alternating voltage waveform according to the embodiment of the invention.

First, a specific operation example regarding coexistence processing in the case of taking synchronization using the time point of the alternating voltage waveform AC will be described. FIG. 10 is a timing chart of coexistence processing using the alternating voltage waveform AC, illustrating a specific example of allocation of communication time periods when a plurality of PLC modems 100 is communicating with each other.

In this example, it will be described under assumption that PLC modems 100A and 100B perform power line communication via the power line 700. When describing matters common to the PLC modems 100A and 100B, they will be described simply as the PLC modem 100.

The PLC modem 100 divides a certain period of time (for example, n seconds) into a plurality of small time periods each having an equal interval and uses the respective small time periods as independent communication time slots based on time division multiplexing. The time slots have a cyclic structure, the starting point of the cycle is synchronized with a synchronization point such as a zero crossing point.

As illustrated in FIG. 10, a control signal time period used for transmitting and receiving a control signal and a data communication time period used for transmitting and receiving a data signal are provided, and these time periods repeatedly occur on a cyclic basis. The data communication time period is divided into four time slots A1, A2, A3, and A4, for example. Further, inside the control signal time period, a time period a1 for requesting the right to use the time slot A1, a time period a2 for requesting the right to use the time slot A2, a time period a3 for requesting the right to use the time slot A3, and a time period a4 for requesting the right to use the time slot A4 are prepared.

Although the present embodiment illustrates the case where the same communication method is used as a data communication method, there is generally a plurality of data communication methods and different methods may be used in each PLC modem. However, it is always the case that only the control signal is common for all the methods.

For example, as illustrated in FIG. 10, when the PLC modem 100A requests the right to use the time slot A1 during the time period a1 and successfully acquires the time slot A1, the PLC modem 100A enters into a state (USE status) where it is able to transmit data during the time slot A1 while the PLC modem 100B enters into a state (WAIT status) where it is unable to transmit data during the time slot A1. When the PLC modem 100B requests the right to use the time slot A3 during the time period a3 and successfully acquires the time slot A3, the PLC modem 100B enters into a state (USE status) where it is able to transmit data during the time slot A3 while the PLC modem 100A enters into a state (WAIT status) where it is unable to transmit data during the time slot A3.

Figure 11:
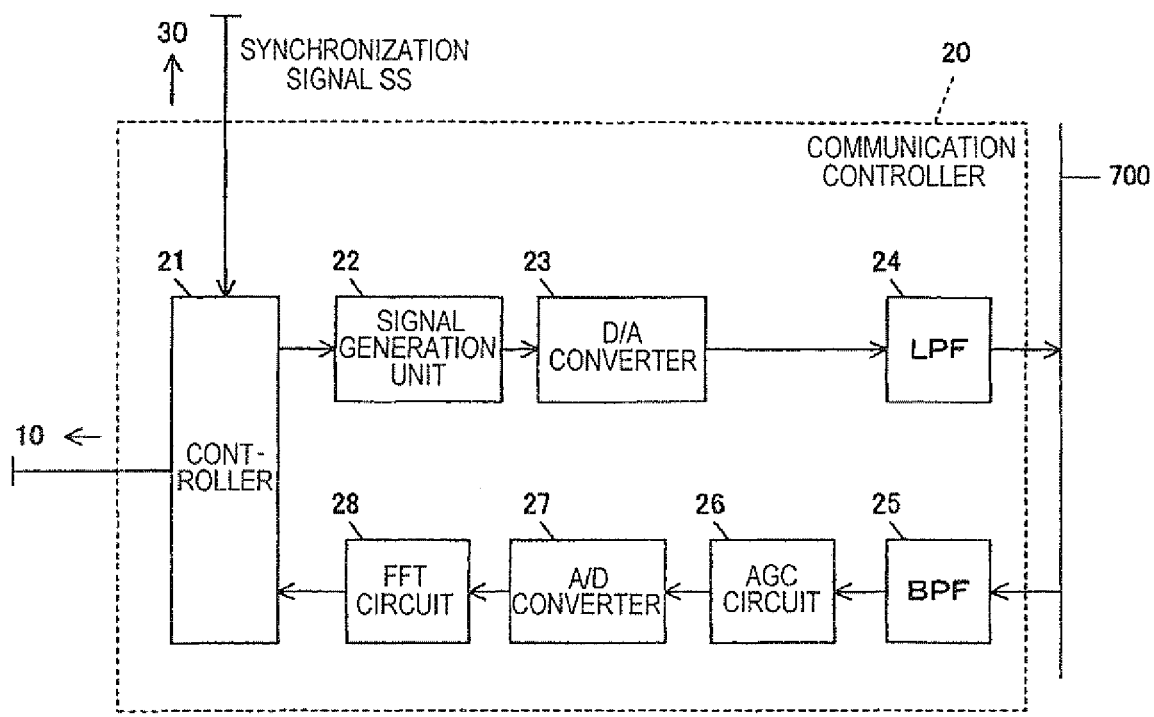
FIG. 11 is a block diagram illustrating a simplified configuration of a communication controller according to the embodiment of the invention.

Subsequently, the internal functional configuration of the communication controller 20 transmitting and receiving a control signal for negotiation using the control signal time period will be described. FIG. 11 is a block diagram illustrating a simplified configuration of a communication controller according to the embodiment of the invention.

As illustrated in FIG. 11, the communication controller 20 includes a controller 21, a signal generation circuit 22, a D/A converter 23, a low-pass filter 24, a band-pass filter 25, an AGC circuit 26, an A/D converter 27, and an FFT (Fast Fourier Transform) circuit 28.

The controller 21 is a digital circuit, which is included in the PLC MAC block 212 of the main IC 210 shown in FIG. 3 and configured to control the operations of the communication controller 20 in synchronization with the timings of the synchronization signal SS input from the AC cycle detector 30 in accordance with the communication request signal input from the data communication circuit 10 or the control signal illustrated in FIG. 4.

The signal generation circuit 22 is included in the PLC PHY block 213 of the main IC 210 shown in FIG. 3 and configured to generate a waveform pattern of the signal necessary to perform negotiation with the other PLC modems connected to the power line 700 in accordance with an instruction of the controller 21. This signal is a multi-carrier signal, and in this embodiment, an OFDM signal is generated as the control signal. In this case, a modulation method is not necessarily limited to the OFDM, and for example, W-OFDM to (OFDM based on Wavelet Transform) or SS-OFDM may be used.

The D/A converter 23 is included in the DAC block 221 of the AFE IC 220 shown in FIG. 3 and configured to convert a digital OFDM signal output from the signal generation circuit 22 into an analog signal. The Low-pass filter (LPF) 24 (which may be a band-pass filter) is included in the LPF block 251 shown in FIG. 3 and configured to allow only the analog signal with the frequency of the control signal band to pass therethrough to be transmitted to the power line 700 while preventing the analog signal with the other frequencies from passing therethrough.

The Band-pass filter (BPF) 25 is included in the BPF block 260 shown in FIG. 3 and configured to allow only the analog signal with the frequency of the control signal band, among signals appearing on the power line 700, to pass therethrough, and output the passed signal to the AGC circuit 26. The AGC circuit 26 is included in the VGA block 223 of the AFE IC 220 shown in FIG. 3 and configured to automatically control the gain of an attenuated input signal so that the input signal can keep a specified level and amplify the input signal.

The A/D converter 27 is included in the ADC block 222 of the AFE IC 220 shown in FIG. 3 and configured to convert the analog signal input from the AGC circuit 26 into a digital signal. The FFT circuit 28 is included in the PLC PHY block 213 of the main IC 210 shown in FIG. 3 and configured to perform predetermined Fast Fourier Transform to the digital signal input from the A/D converter 27, thereby converting multi-carrier signals emerging in time domain into signals in frequency domain. Here, the FFT circuit 28 may perform the FFT processing at 128 points, for example. A correlator may be used in lieu of the FFT circuit 28.

The controller 21 examines the signals output from the FFT circuit 28, and confirms whether or not a signal sent by other PLC modems 100 as the control signal exists in the signals.

As described above, the communication controller 20 performs the control in synchronization with the timings of the synchronization signal which is generated by the AC cycle detector 30 based on the alternating voltage waveform AC. Therefore, it is possible to synchronize the control timings between different PLC modems 100 connected to the same power line 700.

The AC cycle detector 30 shown in FIG. 4 is a circuit that detects a time point at which the voltage level of the alternating voltage waveform of a power changes from a negative polarity voltage to a positive polarity voltage while crossing the zero crossing point, or a time point at which the voltage level changes from positive polarity voltage to negative polarity voltage while crossing the zero crossing point, as the zero crossing point. In practical use, the AC cycle detector 30 outputs a binary signal (output signal) indicating whether the input voltage exceeds a predetermined threshold value determined by the characteristics of an active element such as a transistor, or is lower than the predetermined threshold value, as the synchronization signal SS.

As the AC cycle detector 30, for example, the above-described detection circuit shown in FIG. 5 can be used. In the detection circuit shown in FIG. 5, an output of a binary signal is generated from an alternating input voltage using the photo coupler PC including the light emitting diode and the photo transistor. However, in some cases, the time point at which the synchronization signal SS output from the AC cycle detector 30 changes from high-level voltage (H) to low-level voltage (L) and the time point at which the synchronization signal SS changes from low-level voltage (L) to high-level voltage (H) may deviate from the actual zero crossing point of the alternating waveform, as depicted in FIG. 9. Therefore, in order to be able to detect the correct timings of the synchronization point even when the synchronization point such as the zero crossing point deviates from a predetermined time point, the controller 21 within the communication controller 20 performs the processing described below.

PROCESSING EXAMPLE 1 OF SYNCHRONIZATION POINT DETECTION

Figure 12:
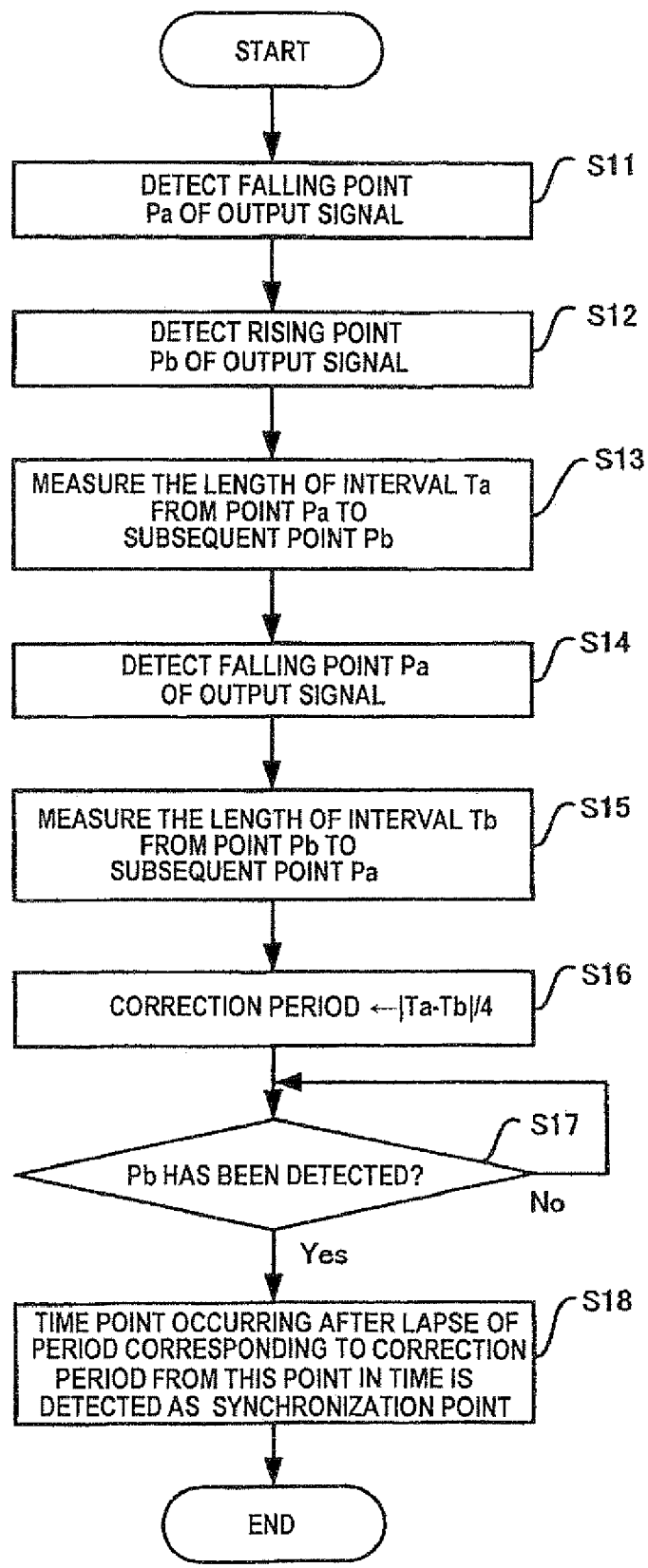
FIG. 12 is a flowchart illustrating Processing Example 1 of synchronization point detection according to the embodiment of the invention.
Figure 13:
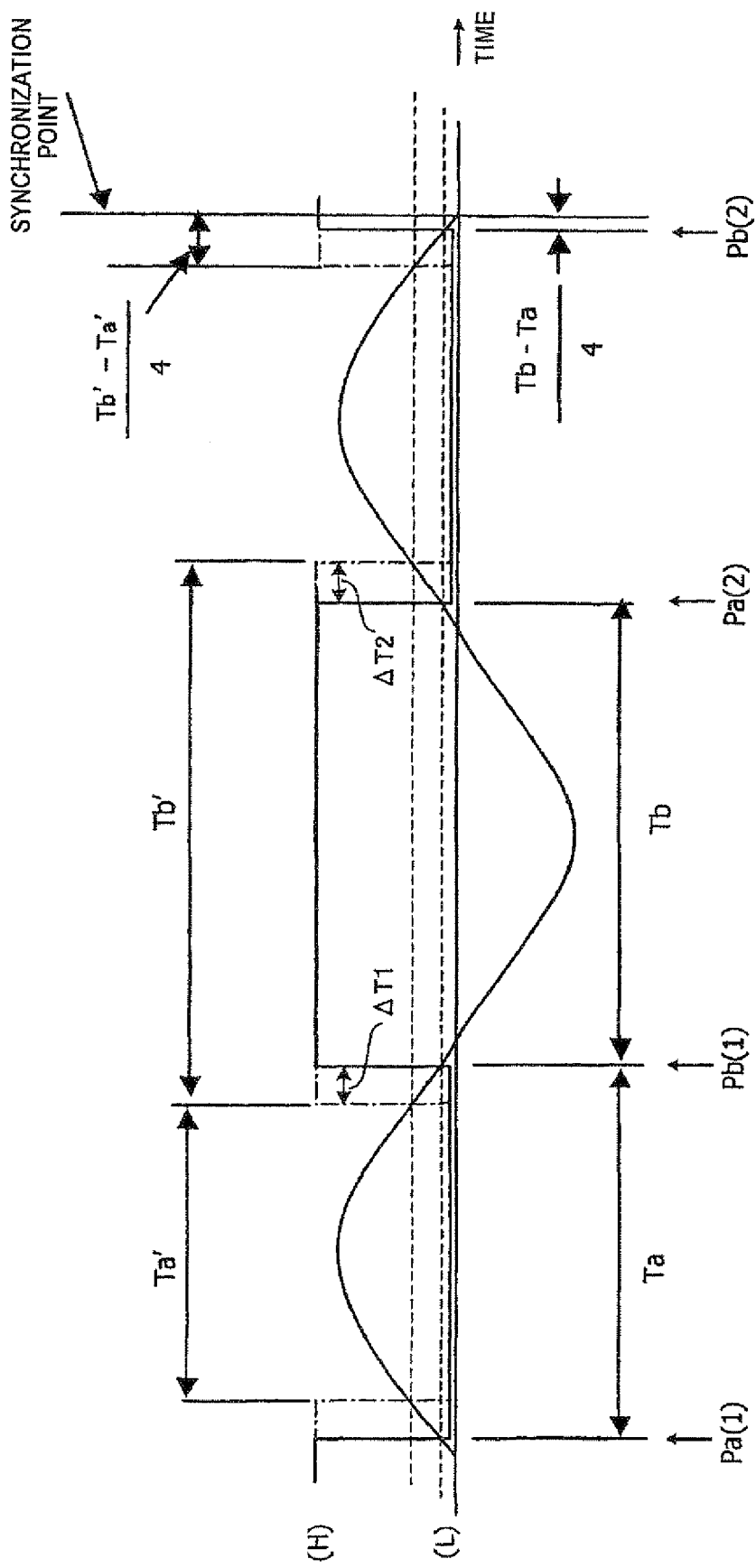
FIG. 13 is a timing chart illustrating the timings of signals corresponding to Processing Example 1 of synchronization point detection according to the embodiment of the invention.

Description of Processing Example 1 will be provided with reference to FIGS. 12 and 13. FIG. 12 is a flowchart illustrating Processing Example 1 for detection of correct synchronization point. FIG. 13 is a timing chart illustrating the timings of signals corresponding to the processing illustrated in FIG. 12. The synchronization signal SS denoted by the broken line in FIG. 13 represents a variation of the time point due to a change in the characteristics.

In step S11 of FIG. 12, the controller 21 monitors the voltage level of the synchronization signal SS, which is the output signal of the AC cycle detector 30, to detect the time point corresponding to the point in time Pa (corresponding to the first changing point Pa(1) in FIG. 13) at which the voltage level falls from high-level voltage (H) to low-level voltage (L). In addition, a timer (not illustrated) for measuring elapsed time is activated.

In step S12, the controller 21 monitors the voltage level of the synchronization signal SS to detect the time point corresponding to the point in time Pb (corresponding to the second changing point Pb(1) in FIG. 13) at which the voltage level rises from low-level voltage (L) to high-level voltage (H).

In step S13, the controller 21 refers to the timer to measure the period of time elapsed until the point Pb was detected in step S12 after the point Pa was detected in step S11, namely, the length of an interval Ta, which is the first interval in FIG. 13. At this time, the timer is reactivated for subsequent measurement. Alternatively, the interval Ta may be calculated from a difference between the counted values of the points Pa(1) and Pb(1) using the timer which continuously counts the elapsed time.

In step S14, the controller 21 monitors the potential of the synchronization signal SS to detect the time point corresponding to the point in time Pa (corresponding to Pa(2) in FIG. 13) at which the potential falls from high-level voltage (H) to low-level voltage (L).

In step S15, the controller 21 refers to the timer to measure the period of time elapsed until the point Pa(2) was detected in step S14 after the point Pb(1) was detected in step S12, namely, the length of an interval Tb, which is the second interval in FIG. 13. At this time, the timer is reactivated for subsequent measurement. Alternatively, the interval Tb may be calculated from a difference between the counted values of the points Pb(1) and Pa(2) using the timer which continuously counts the elapsed time.

In step S16, the controller 21 calculates a correction period. Specifically, the correction period is calculated as one-fourth (¼) of the difference between the length of the interval Ta obtained in step S13 and the length of the interval Tb obtained in step Si 5.

In step S17, the controller 21 monitors the voltage level of the synchronization signal SS to detect the time point corresponding to the point in time Pb (corresponding to Pb(2) in FIG. 13) at which the voltage level rises from low-level voltage (L) to high-level voltage (H). The flow proceeds to next step S18 when the time point is detected.

In step S18, the correction value is set in the timer to monitor the period of time elapsed after the time point at which the point Pb(2) was detected. Then, the time point occurring after a lapse of a period of time ((Tb−Ta)/4) corresponding to the correction value from the point Pb(2) is detected as the correct synchronization point.

This example is the case where Ta is short and Tb is long. In this case, the synchronization point is corrected from the point Pb by the amount of (Tb−Ta)/4. On the other hand, in the case where Ta is long and Tb is short, the synchronization point is corrected from the point Pa by the amount of (Ta−Tb)/4.

The power line communication apparatus using the synchronization point detection method is able to perform power line communication with other power line communication apparatuses based on accurate synchronization. Therefore, it is possible to improve the quality of the power line communication. Accordingly, for example, even when the time width of the time slots used in the power line communication is decreased and the total number of time slots is increased, it is possible to take accurate synchronization. As a result, it is possible to improve the signal transmission speed or the utilization efficiency of the transmission channel.

The processing illustrated in FIG. 12 may be implemented in software processed by a microprocessor and may be performed by a dedicated logic circuit if there is no enough time to do so.

As can be seen from the difference between the synchronization signal SS denoted by the solid line and the synchronization signal SS denoted by the broken line in FIG. 13, when the rising point of the synchronization signal SS is moved backward (leftward) in time axis by ΔT1 due to the change in the characteristics of the photo coupler PC or the like, the falling point is moved forward (rightward) in time axis by ΔT2. The amounts of ΔT1 and ΔT2 are equal in time. Therefore, the detected interval Tb' is increased by (ΔT1+ΔT2) compared with the interval Tb before the change. On the other hand, the detected interval Ta' is decreased by (ΔT1+ΔT2) compared with the interval Ta before the change. Therefore, by correcting the time point occurring after a lapse of a period of time corresponding to the correction value given by (Tb−Ta)/4 from the rising point of the synchronization signal SS as the synchronization point, it is possible to make the synchronization point approach the correct zero crossing point.

According to this configuration, it is possible to suppress the influence of the characteristic change of the circuit element such as the photo coupler or the like and to detect the time point exactly synchronized with the alternating waveform. Since the sum (corresponding to one-cycle period of the alternating waveform) of the first interval and the second interval is constant, the deviation of the time point appears as the difference between the first interval and the second interval. Therefore, by using the correction value calculated from the difference, it is possible to detect the correct time point of the synchronization point.

In the case of using a detector integrating therein a photo coupler and a transistor, the first interval decreases by ΔT×2 when the CTR characteristic deteriorates. Similarly, the second interval increases by ΔT×2 when the CTR characteristic deteriorates. Therefore, the one-fourth of the difference between the first interval and the second interval is equivalent to the correction value necessary for compensating the deviation amount. By using the correction value, it is possible to detect the correct synchronization point.

Figure 14:
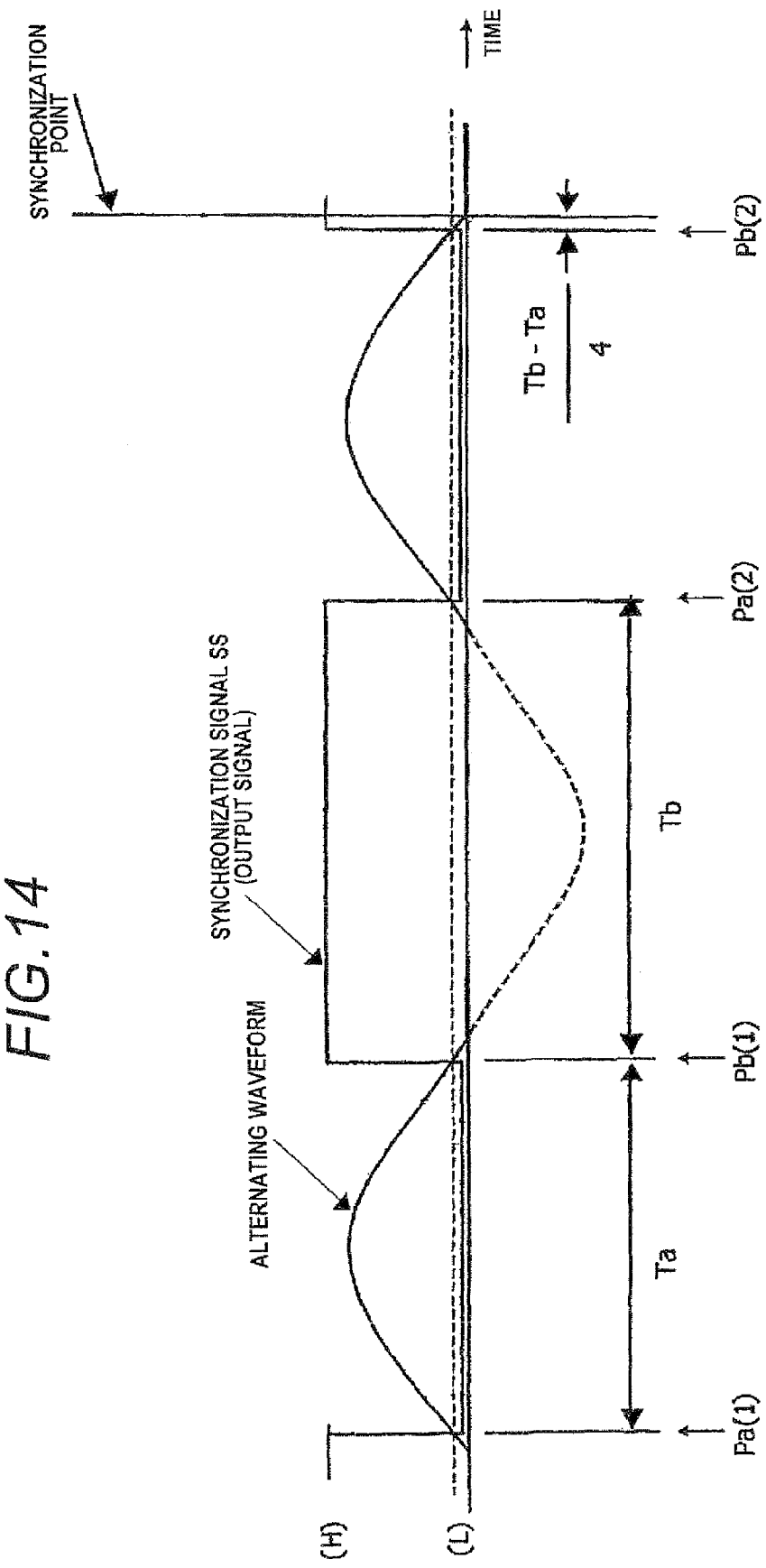
FIG. 14 is a timing chart illustrating the timings of signals when an rectification function is used in the circuit shown in FIG. 5 according to the embodiment of the invention.

The rectification function of the light emitting diode in the circuit shown in FIG. 5 may be utilized. In this case, as illustrated in FIG. 14, the AC waveform is rectified so that a forward voltage is applied during the interval Ta and a reverse voltage is applied during the interval Tb in one-cycle period of the AC waveform. Moreover, a predetermined threshold voltage is set so that the rising point and the falling point are arranged at points in time during which the voltage level of the AC waveform is higher than zero.

By doing so, it is possible to determine which one of the intervals Ta and Tb is longer and to make sure that the time point occurring after a lapse of a period of time corresponding to (Tb−Ta)/4 from the falling point, where Ta is the length of the first interval and Tb is the length of the second interval, is always determined as the synchronization point. In this example, although rectification was performed using the light emitting diode of the photo coupler, other diodes for rectification may be added.

PROCESSING EXAMPLE 2 OF SYNCHRONIZATION POINT DETECTION

Figure 15:
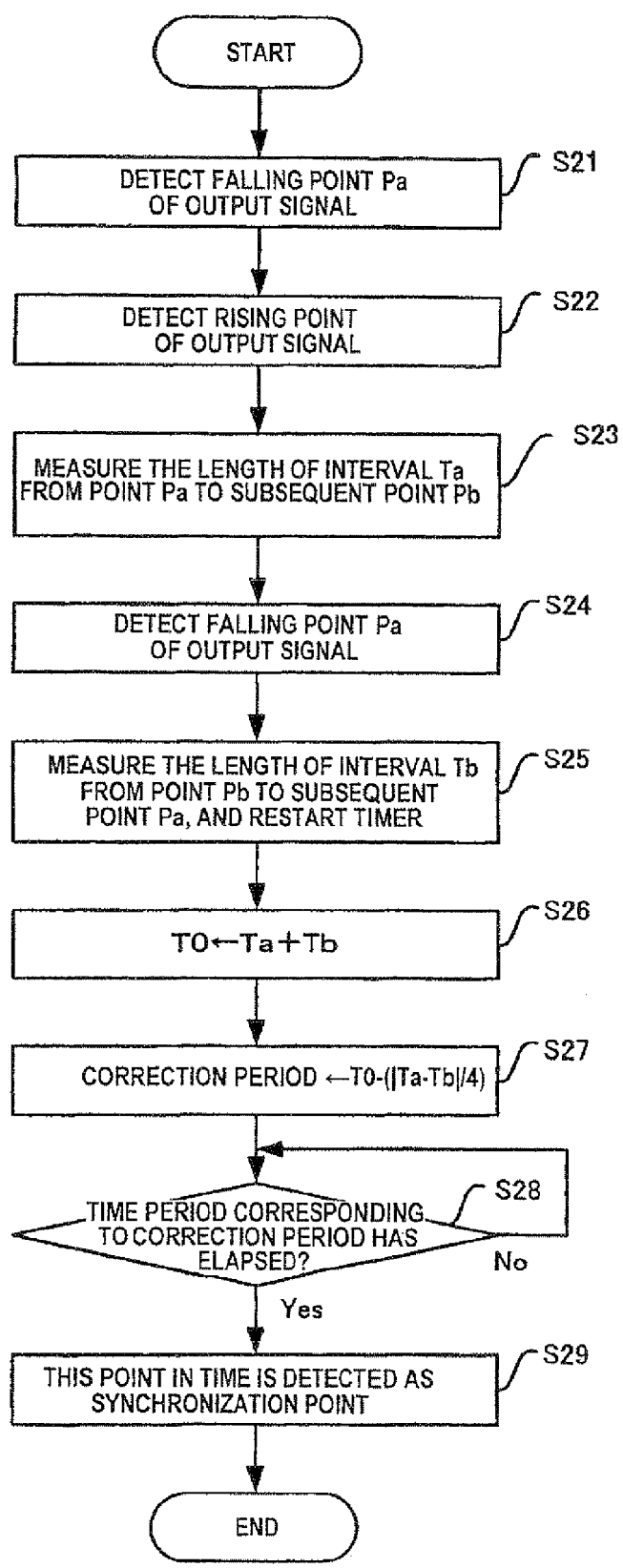
FIG. 15 is a flowchart illustrating Processing Example 2 of synchronization point detection according to the embodiment of the invention.
Figure 16:
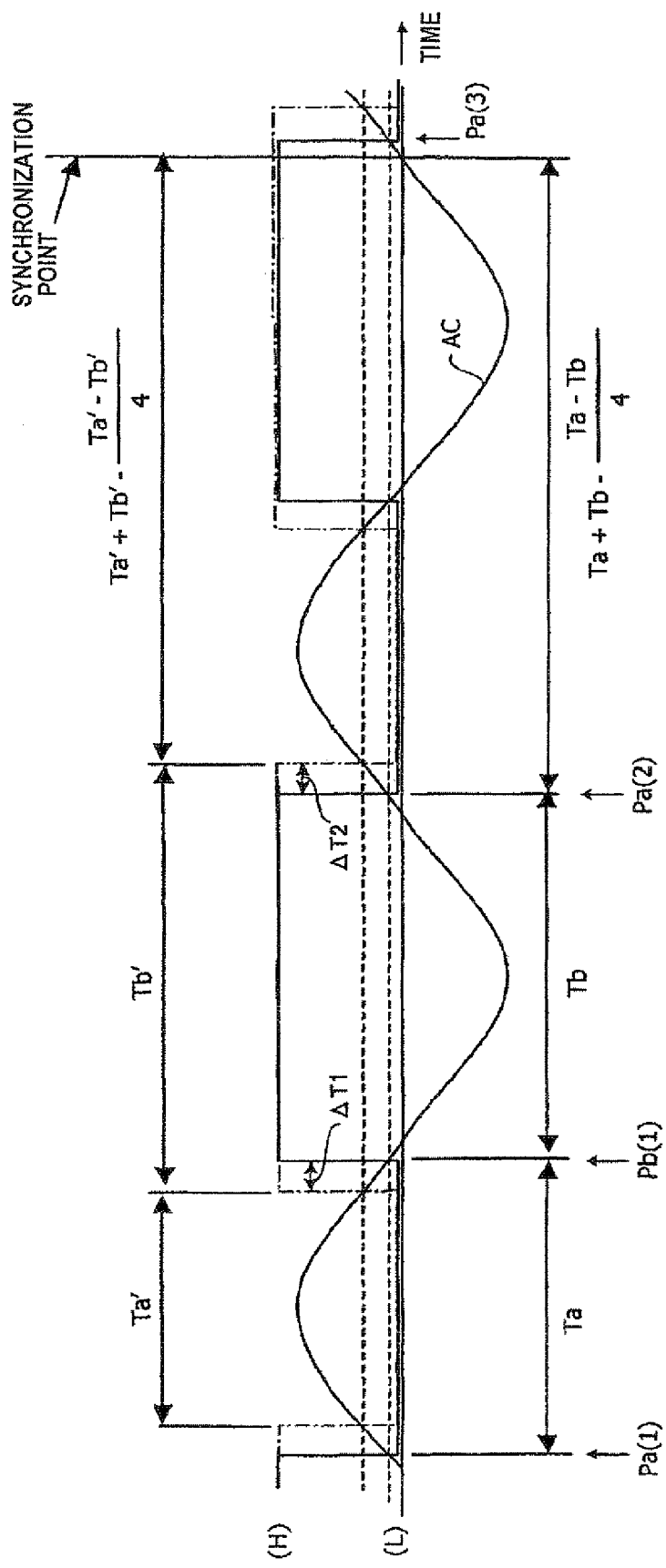
FIG. 16 is a timing chart illustrating the timings of signals corresponding to Processing Example 2 of synchronization point detection according to the embodiment of the invention.

Description of Processing Example 2 will be provided with reference to FIGS. 15 and 16. FIG. 15 is a flowchart illustrating Processing Example 2 for detection of correct synchronization point. FIG. 16 is a timing chart illustrating the timings of signals corresponding to the processing illustrated in FIG. 15.

In step S21 of FIG. 15, the controller 21 monitors the voltage level of the synchronization signal SS, which is the output signal of the AC cycle detector 30, to detect the time point corresponding to the point in time Pa (corresponding to Pa(1) in FIG. 16) at which the voltage level falls from high-level voltage (H) to low-level voltage (L). In addition, a timer (not illustrated) for measuring elapsed time is activated.

In step S22, the controller 21 monitors the voltage level of the synchronization signal SS to detect the time point corresponding to the point in time Pb (corresponding to Pb(1) in FIG. 16) at which the voltage level rises from low-level voltage (L) to high-level voltage (H).

In step S23, the controller 21 refers to the timer to measure the period of time elapsed until the point Pb was detected in step S22 after the point Pa was detected in step S21, namely, the length of an interval Ta illustrated in FIG. 16. At this time, the timer is reactivated for subsequent measurement.

In step S24, the controller 21 monitors the voltage level of the synchronization signal SS to detect the time point corresponding to the point in time Pa (corresponding to Pa(2) in FIG. 16) at which the voltage level falls from high-level voltage (H) to low-level voltage (L).

In step S25, the controller 21 refers to the timer to measure the period of time elapsed until the point Pa(2) was detected in step S24 after the point Pb(1) was detected in step S22, namely, the length of an interval Tb illustrated in FIG. 16. At this time, the timer is reactivated for subsequent measurement.

In step S26, the controller 21 calculates one-cycle period T0 of the alternating voltage waveform AC. That is to say, the sum of the interval Ta detected in step S23 and the interval Tb detected in step S25 corresponds to the one-cycle period T0.

In step S27, the controller 21 calculates a correction value. Specifically, the value obtained by subtracting the deviation amount (Ta−Tb)/4 from the one-cycle period T0 calculated in step S26 is used as the correction value.

In step S28, the controller 21 monitors the value (elapsed time) of the timer that is reactivated in step S25 to determine whether or not the value has reached the correction value calculated in step S27. That is to say, a determination is made as to whether or not the time elapsed from the point Pa(2) in FIG. 16 has reached the correction value.

If the value of the timer reached the correction value, the flow proceeds from step S28 to step S29, the controller 21 detects this time point as the correct synchronization point.

The processing illustrated in FIG. 15 may be implemented in software processed by a microprocessor and may be performed by a dedicated logic circuit if there is no enough time to do so.

As can be seen from the difference between the synchronization signal SS denoted by the solid line and the synchronization signal SS denoted by the broken line in FIG. 16, when the rising point of the synchronization signal SS is moved backward (leftward) in time axis by $\Delta T1$ due to the change in the characteristics of the photo coupler PC or the like, the falling point is moved forward (rightward) in time axis by $\Delta T2$. The amounts of $\Delta T1$ and $\Delta T2$ are equal in time. Therefore, the detected interval Tb' is increased by ($\Delta T1 + \Delta T2$) compared with the interval Tb before the change. On the other hand, the detected interval Ta' is decreased by ($\Delta T1 + \Delta T2$) compared with the interval Ta before the change. Therefore, by detecting the time point which is corrected from the rising or falling point of the synchronization signal SS by the deviation amount (Tb−Ta)/4 as the correct synchronization point, it is possible to make the synchronization point approach the correct zero crossing point.

However, since the synchronization point in FIG. 16 is positioned slightly forward in time of the falling point Pa(3), the synchronization point cannot be corrected once after the falling point Pa(3) was detected. Therefore, the value obtained by subtracting the deviation amount from the one-cycle period T0 is used as the correction value.

According to the synchronization point detection method, even when the (Ta−Tb) or (Tb−Ta) is a negative value, it is possible to suppress the influence of the characteristic deterioration of the circuit element such as the photo coupler and to detect the time point exactly synchronized with the alternating waveform.

PROCESSING EXAMPLE 3 OF SYNCHRONIZATION POINT DETECTION

Figure 17:
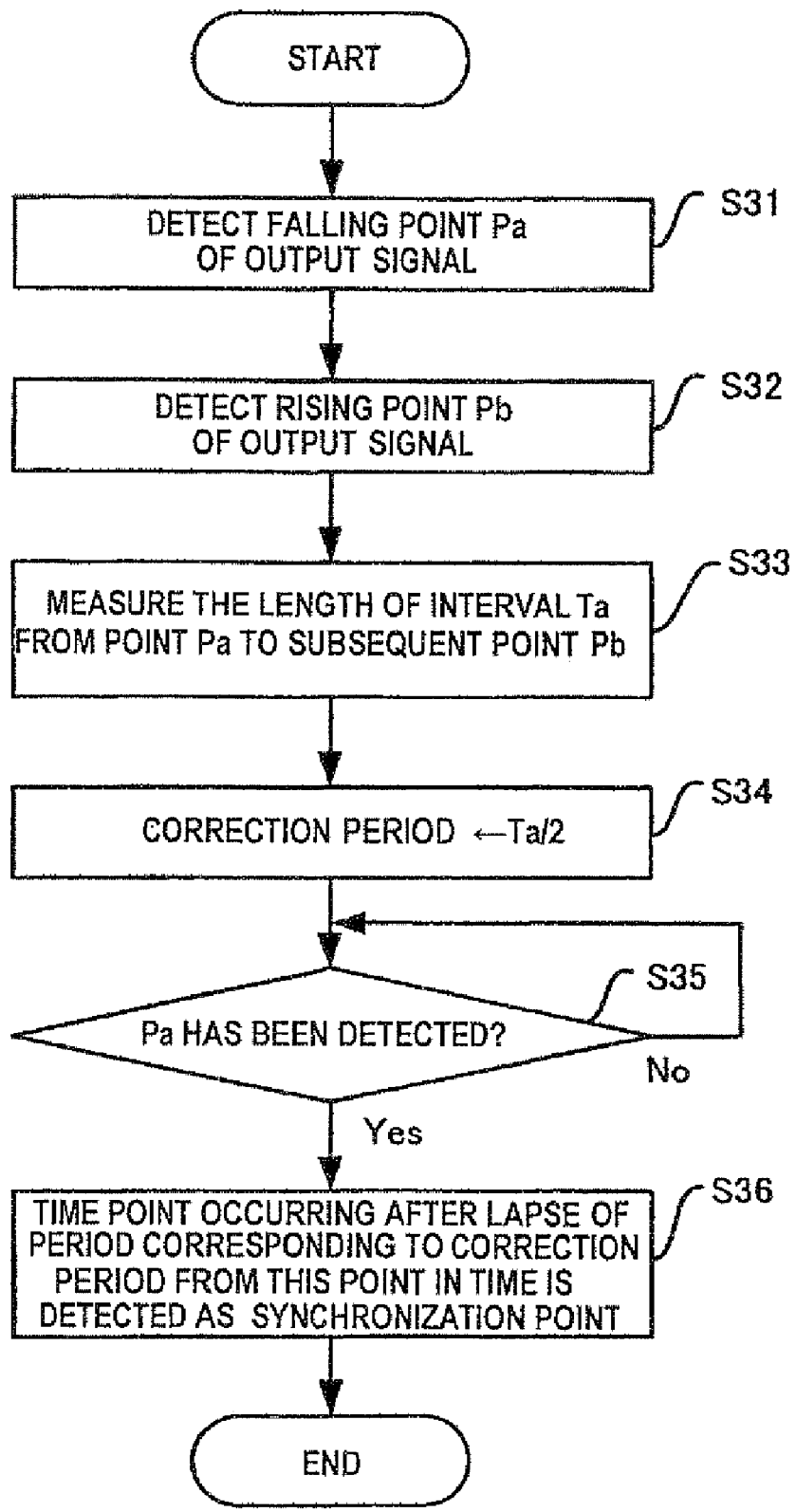
FIG. 17 is a flowchart illustrating Processing Example 3 of synchronization point detection according to the embodiment of the invention.
Figure 18:
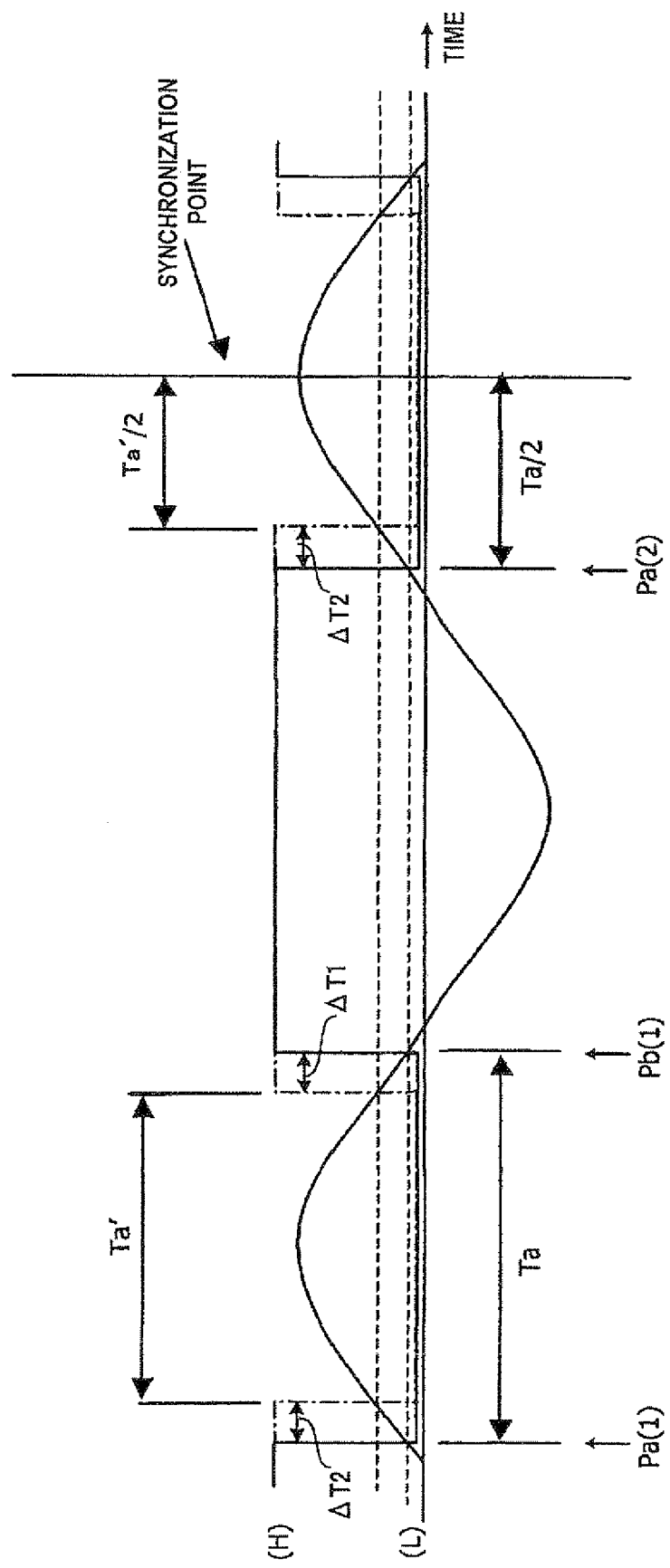
FIG. 18 is a timing chart illustrating the timings of signals corresponding to Processing Example 3 of synchronization point detection according to the embodiment of the invention.

Description of Processing Example 3 will be provided with reference to FIGS. 17 and 18. FIG. 17 is a flowchart illustrating Processing Example 3 for detection of correct synchronization point. FIG. 18 is a timing chart illustrating the timings of signals corresponding to the processing illustrated in FIG. 17.

In step S31 of FIG. 17, the controller 21 monitors the voltage level of the synchronization signal SS, which is the output signal of the AC cycle detector 30, to detect the time point corresponding to the point in time Pa (corresponding to Pa(1) in FIG. 18) at which the voltage level falls from high-level voltage (H) to low-level voltage (L). In addition, a timer (not illustrated) for measuring elapsed time is activated.

In step S32, the controller 21 monitors the voltage level of the synchronization signal SS to detect the time point corresponding to the point in time Pb (corresponding to Pb(1) in FIG. 18) at which the voltage level rises from low-level voltage (L) to high-level voltage (H).

In step S33, the controller 21 refers to the timer to measure the period of time elapsed until the point Pb was detected in step S32 after the point Pa was detected in step S31, namely, the length of an interval Ta illustrated in FIG. 18.

In step S34, the controller 21 calculates a correction value. Specifically, the half of the length of the interval Ta obtained in step S33 is determined as the correction value.

In step S35, the controller 21 monitors the voltage level of the synchronization signal SS to detect the time point corresponding to the point in time Pa (corresponding to Pa(2) in FIG. 18) at which the voltage level falls from high-level voltage (H) to low-level voltage (L).

In step S36, the controller 21 sets the correction value determined in step S34 in the timer, reactivates the timer, and waits until the period corresponding to the correction value elapses. Then, the time point occurring after a lapse of the period corresponding to the correction value is detected as the correct synchronization point.

As can be seen from the difference between the synchronization signal SS denoted by the solid line and the synchronization signal SS denoted by the broken line in FIG. 18, when the rising point of the synchronization signal SS is moved backward (leftward) in time axis by $\Delta T1$ due to the change in the characteristics of the photo coupler PC or the like, the falling point is moved forward (rightward) in time by $\Delta T2$. The amounts of $\Delta T1$ and $\Delta T2$ are equal in time. Therefore, the detected interval Ta' is decreased by ($\Delta T1+\Delta T2$) compared with the interval Ta before the change.

However, since the lengths of $\Delta T1$ and $\Delta T2$ are equal in time, the time point at the center of the point Pa and the subsequent point Pb rarely deviates from a certain phase (in this example, 90 degrees) of the alternating waveform. Therefore, by using the time point occurring after a lapse of the correction value corresponding to the half of the interval Ta from the falling point of the synchronization signal SS as the synchronization point, it is possible to suppress the influence of the characteristic change.

With this configuration, it is possible to suppress the influence of the characteristic deterioration of the circuit element such as the photo coupler and to detect the time point exactly synchronized with the alternating waveform. For example, since the synchronization point of an alternating waveform deviates from a zero crossing point in a linearly symmetric fashion due to a secular change or a temperature change, the deviation cancels out at the central point of consecutive zero crossing points. Therefore, by detecting this point as the synchronization point, it is possible to detect the correct synchronization point.

PROCESSING EXAMPLE 4 OF SYNCHRONIZATION POINT DETECTION

Figure 19:
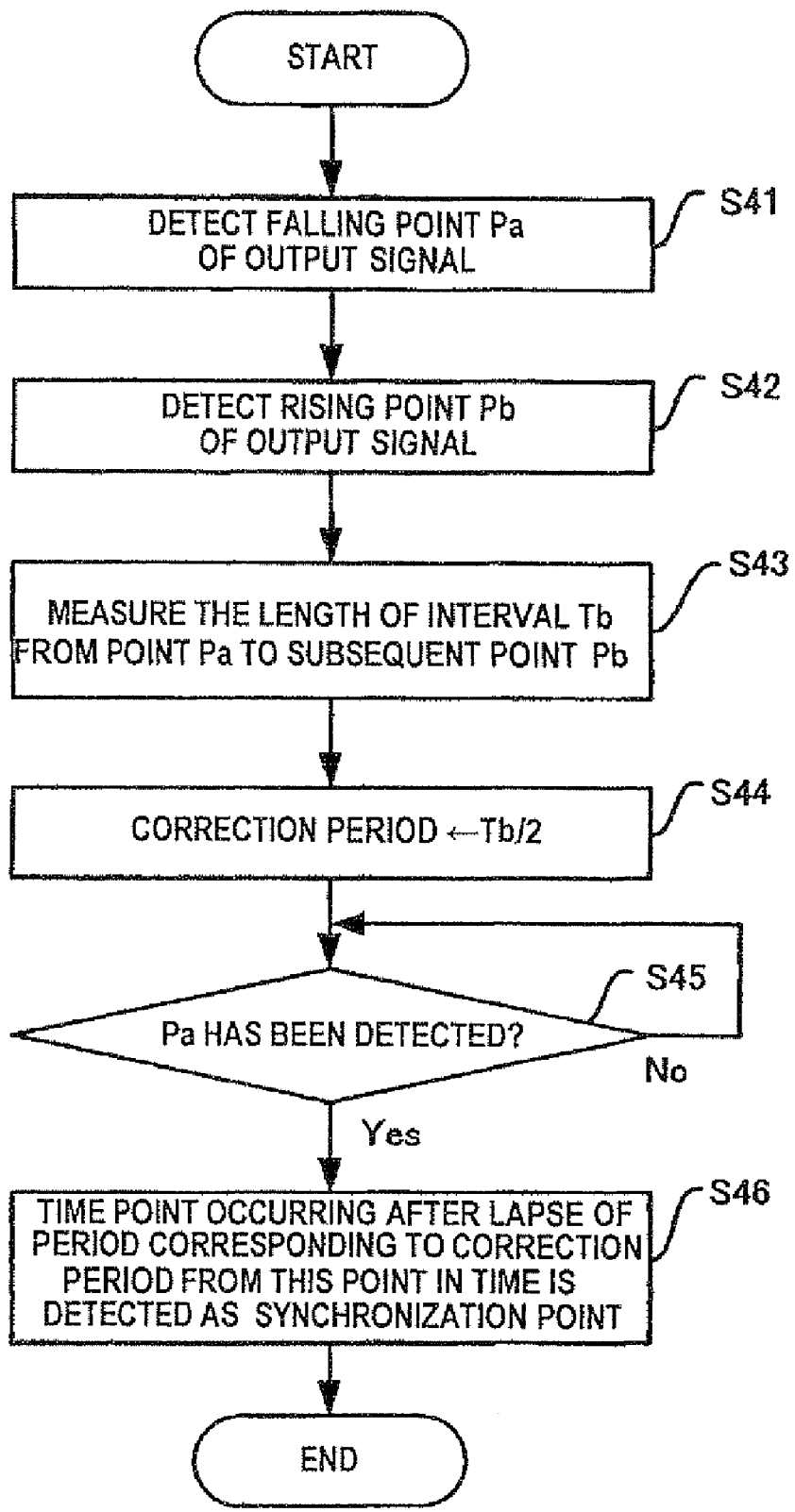
FIG. 19 is a flowchart illustrating Processing Example 4 of synchronization point detection according to the embodiment of the invention.
Figure 20:
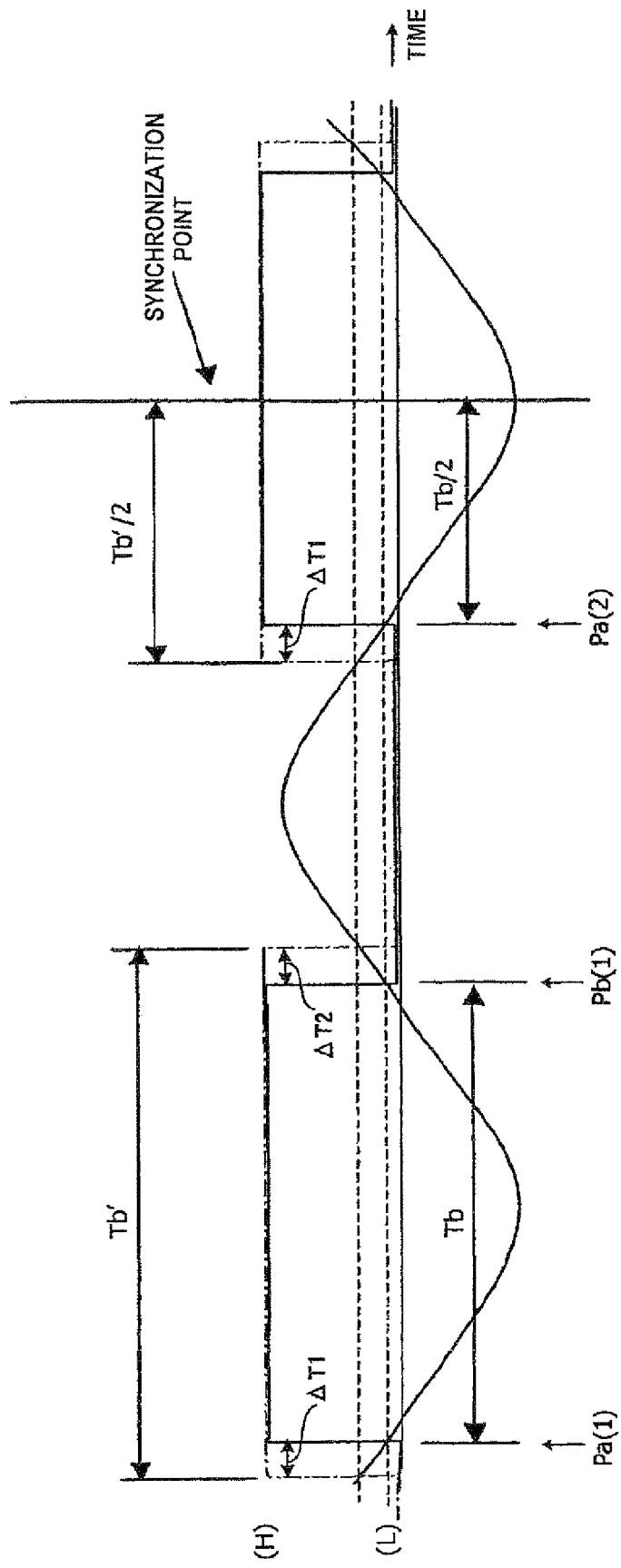
FIG. 20 is a timing chart illustrating the timings of signals corresponding to Processing Example 4 of synchronization point detection according to the embodiment of the invention.

Description of Processing Example 4 will be provided with reference to FIGS. 19 and 20. FIG. 19 is a flowchart illustrating Processing Example 4 for detection of correct synchronization point. FIG. 20 is a timing chart illustrating the timings of signals corresponding to the processing illustrated in FIG. 19.

In step S41 of FIG. 19, the controller 21 monitors the voltage level of the synchronization signal SS, which is the output signal of the AC cycle detector 30, to detect the time point corresponding to the point in time Pa (corresponding to Pa(1) in FIG. 20) at which the voltage level rises from low-level voltage (L) to high-level voltage (H). In addition, a timer (not illustrated) for measuring elapsed time is activated.

In step S42, the controller 21 monitors the voltage level of the synchronization signal SS to detect the time point corresponding to the point in time Pb (corresponding to Pb(1) in FIG. 20) at which the voltage level falls from high-level voltage (H) to low-level voltage (L).

In step S43, the controller 21 refers to the timer to measure the period of time elapsed until the point Pb was detected in step S42 after the point Pa was detected in step S41, namely, the length of an interval Tb illustrated in FIG. 20.

In step S44, the controller 21 calculates a correction value. Specifically the half of the length of the interval Tb obtained in step S43 is determined as the correction value.

In step S45, the controller 21 monitors the voltage level of the synchronization signal SS to detect the time point corresponding to the point in time Pa (corresponding to Pa(2) in FIG. 20) at which the voltage level rises from low-level voltage (L) to high-level voltage (H).

In step S46, the controller 21 sets the correction value determined in step S44 in the timer, reactivates the timer, and waits until the period corresponding to the correction value elapses. Then, the time point occurring after a lapse of the period corresponding to the correction value is detected as the correct synchronization point.

As can be seen from the difference between the synchronization signal SS denoted by the solid line and the synchronization signal SS denoted by the broken line in FIG. 20, when the rising point of the synchronization signal SS is moved backward (leftward) in time axis by $\Delta T1$ due to the change in the characteristics of the photo coupler PC or the like, the falling point is moved forward (rightward) in time axis by $\Delta T2$. The amounts of $\Delta T1$ and $\Delta T2$ are equal in time. Therefore, the detected interval Tb' is increased by ($\Delta T1+\Delta T2$) compared with the interval Tb before the change.

However, since the lengths of $\Delta T1$ and $\Delta T2$ are equal in time, the time point at the center of the point Pa and the subsequent point Pb rarely deviates from a certain phase (in this example, 270 degrees) of the alternating waveform. Therefore, by using the time point occurring after a lapse of the correction value corresponding to the half of the interval Tb from the rising point Pa(2) of the synchronization signal SS as the synchronization point, it is possible to suppress the influence of the characteristic change, With this configuration, it is possible to suppress the influence of the characteristic deterioration of the circuit element such as the photo coupler and to detect the time point exactly synchronized with the alternating waveform. For example, since the synchronization point of an alternating waveform deviates from a zero crossing point in a linearly symmetric fashion due to a secular change or a temperature change, the deviation cancels out at the central point of consecutive zero crossing points. Therefore, by detecting this point as the synchronization point, it is possible to detect the correct synchronization point.

Specific numeric values regarding the reduction of deviation of the synchronization point, obtained as a result of the above-described processing are summarized in FIG. 21. In FIG. 21, the numeric values (time) for "rising point" and "failing point" represent the deviation amounts of the synchronization point before correction, and the numeric values for "synchronization point 1" "synchronization point 2," "synchronization point 3," and "synchronization point 4" represent the deviation amounts of the synchronization point obtained as the results of the processing in FIGS. 12, 15, 17, and 19, respectively, As can be seen from the results in FIG. 21, it is possible to greatly improve the synchronization point detection accuracy by performing the processing in any of FIGS. 12, 15, 17, and 19.

Furthermore, the improvement in the synchronization point detection accuracy provides advantages described below.

In the above-described example shown in FIG. 10, although the number of divided time slots is four, when the time width of each time slot is decreased, it is possible to arrange more time slots in the data communication time period of the same length. The increased number of time slots enables fine adjustment of the ratio of the number of time slots usable for transmission by the PLC modem 100A to the number of time slots usable for transmission by the PLC modem 100B, thereby increasing the utilization efficiency of the transmission channel and achieving highly efficient communication.

The improvement in the synchronization point detection accuracy enables to decrease the time width of the time slot performing the power line communication and to increase the total number of time slots, thereby improving the communication speed and the utilization efficiency of the transmission channel.

As described above, the invention can be applied to a synchronization point detection method and a power line communication apparatus capable of suppressing the influence of the characteristic deterioration of a circuit element such as a photo coupler and detecting the time point exactly synchronized with an alternating waveform.

This application is based upon and claims the benefit of priority of Japanese Patent Application No. 2008-154274 filed on Jun. 12, 2008, the contents of which are incorporated herein by reference in its entirety,

What is claimed is:

1. A method of synchronization point detection for detecting a synchronization point of an alternating waveform of an alternating power based on a comparison of the alternating waveform and a threshold voltage, the method comprising the steps of:
    detecting a rising point at which the voltage of the alternating waveform changes from a level lower than the threshold voltage to a level equal to or higher than the threshold voltage;
    detecting a falling point at which the voltage of the alternating waveform changes from a level equal to or higher than the threshold voltage to a level lower than the threshold voltage;
    measuring a first interval from the rising point to the falling point subsequent to the rising point;
    measuring a second interval from the falling point to the rising point subsequent to the falling point; and
    determining the synchronization point based on a difference between the length of the first interval and the length of the second interval.

2. The method according to claim 1, wherein the step of determining the synchronization point determines a time point occurring after a lapse of a period of time corresponding to (Ta−Tb)/4 from the rising point as the synchronization point, where Ta is the first interval and Tb is the second interval.

3. The method according to claim 1, wherein the step of determining the synchronization point determines a time point occurring after a lapse of a period of time corresponding to (Tb−Ta)/4 from the falling point as the synchronization point, where Ta is the first interval and Tb is the second interval.

4. The method according to claim 3, wherein the alternating power is subjected to half-wave rectification with the first interval being used as a forward voltage period and the second interval being used as a reverse voltage period, thereby setting the threshold voltage so as to satisfy the relationship of Ta<Tb.

5. The method according to claim 1, wherein the step of determining the synchronization point determines a time point occurring after a lapse of a period of time corresponding to Ta+Tb+(Ta−Tb)/4 from the rising point as the synchronization point, where Ta is the first interval and Tb is the second interval.

6. The method according to claim 1, wherein the step of determining the synchronization point determines a time point occurring after a lapse of a period of time corresponding to Ta+Tb+(Tb−Ta)/4 from the falling point as the synchronization point, where Ta is the length of the first interval and Tb is the length of the second interval.

7. A power line communication apparatus that performs a communication with another power line communication apparatus via a power line to which electric power of an alternating power is supplied, the power line communication apparatus comprising:
    a detection circuit to which the alternating power is input, and which outputs a binary signal based on whether or not the level of a waveform of the alternating power is higher than a threshold value;
    a communication unit that transmits a control signal to the other power line communication apparatus, and
    a controller that transmits the control signal to the other power line communication apparatus based on the binary signal,
    wherein the controller is configured to:
        detect a rising point at which the level of the waveform of the alternating power changes from a level lower than the threshold value to a level equal to or higher than the threshold value;
        detect a falling point at which the level of the waveform of the alternating power changes from a level equal to or higher than the threshold value to a level lower than the threshold value;
        measure the length of a first interval from the rising point to the falling point subsequent to the rising point;
        measure the length of a second interval from the failing point to the rising point subsequent to the falling point; and
        transmit the control signal at timings based on a difference between the length of the first interval and the length of the second interval.

8. The power line communication apparatus according to claim 7, wherein the control signal is transmitted at a time point occurring after a lapse of a period of time corresponding to (Ta−Tb)/4 from the rising point, where Ta is the length of the first interval and Tb is the length of the second interval.

9. The power line communication apparatus according to claim 7, wherein the control signal is transmitted at a time point occurring after a lapse of a period of time corresponding to (Tb−Ta)/4 from the falling point, where Ta is the length of the first interval and Tb is the length of the second interval.

10. The power line communication apparatus according to claim 9, wherein the detection circuit includes a half-wave rectifier that rectifies the waveform of the alternating power with the first interval being used as a forward voltage period and the second interval being used as a reverse voltage period, and
    wherein the threshold voltage is set so as to satisfy the relationship of Ta<Tb, where Ta is the length of the first interval and Tb is the length of the second interval, and the control signal is transmitted at a time point occurring after a lapse of a period of time corresponding to (Tb−Ta)/4 from the rising point.

11. A synchronization point detection apparatus to detect a synchronization point of an alternating waveform of an alternating power based on a comparison of the alternating waveform and a threshold voltage, the synchronization point detection apparatus comprising:
- a detecting unit that detects a rising point at which the voltage of the alternating waveform changes from a level lower than the threshold voltage to a level equal to or higher than the threshold voltage and a falling point at which the voltage of the alternating waveform changes from a level equal to or higher than the threshold voltage to a level lower than the threshold voltage;
- a measuring unit that measures a first interval from the rising point to the falling point subsequent to the rising point and a second interval from the falling point to the rising point subsequent to the falling point; and
- a determining unit that determines the synchronization point based on a difference between the length of the first interval and the length of the second interval.

* * * * *